(12) United States Patent
Vargantwar

(10) Patent No.: US 10,595,276 B1
(45) Date of Patent: Mar. 17, 2020

(54) METHOD AND SYSTEM FOR CONTENTION-BASED PROTOCOL AND UNLICENSED BAND USE

(71) Applicant: Verizon Patent and Licensing Inc., Arlington, VA (US)

(72) Inventor: Sachin Vargantwar, Cumming, GA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 16/123,250

(22) Filed: Sep. 6, 2018

(51) Int. Cl.
| | | |
|---|---|---|
| *H04W 52/14* | (2009.01) | |
| *H04W 74/08* | (2009.01) | |
| *H04W 52/36* | (2009.01) | |
| *H04W 16/14* | (2009.01) | |
| *H04W 72/04* | (2009.01) | |

(52) U.S. Cl.
CPC ......... *H04W 52/143* (2013.01); *H04W 16/14* (2013.01); *H04W 52/367* (2013.01); *H04W 74/0816* (2013.01); *H04W 72/0446* (2013.01)

(58) Field of Classification Search
CPC . H04W 52/383; H04W 52/48; H04W 52/143; H04W 74/0816
USPC .......... 455/522, 69, 422.1, 509, 452.1, 67.11
See application file for complete search history.

(56) References Cited

U.S. PATENT DOCUMENTS

| | | | |
|---|---|---|---|
| 2011/0076008 A1* | 3/2011 | Minato | H04J 14/005 398/1 |
| 2015/0248153 A1* | 9/2015 | Shimizu | H02J 9/005 713/340 |
| 2017/0142741 A1* | 5/2017 | Kaur | H04W 56/002 |
| 2018/0288006 A1* | 10/2018 | Somasandharam | H04L 9/3234 |

* cited by examiner

*Primary Examiner* — John J Lee

(57) ABSTRACT

A method, a device, and a non-transitory computer-readable storage medium are described in which a Listen Before Talk-based dynamic energy detection service is provided. The dynamic energy detection service includes provisioning a dynamic threshold value that is used during a clear channel assessment procedure. The dynamic threshold value may be increased or decreased by an adjustment value depending on the success or failure of a data transmission indicated by an end device.

20 Claims, 19 Drawing Sheets

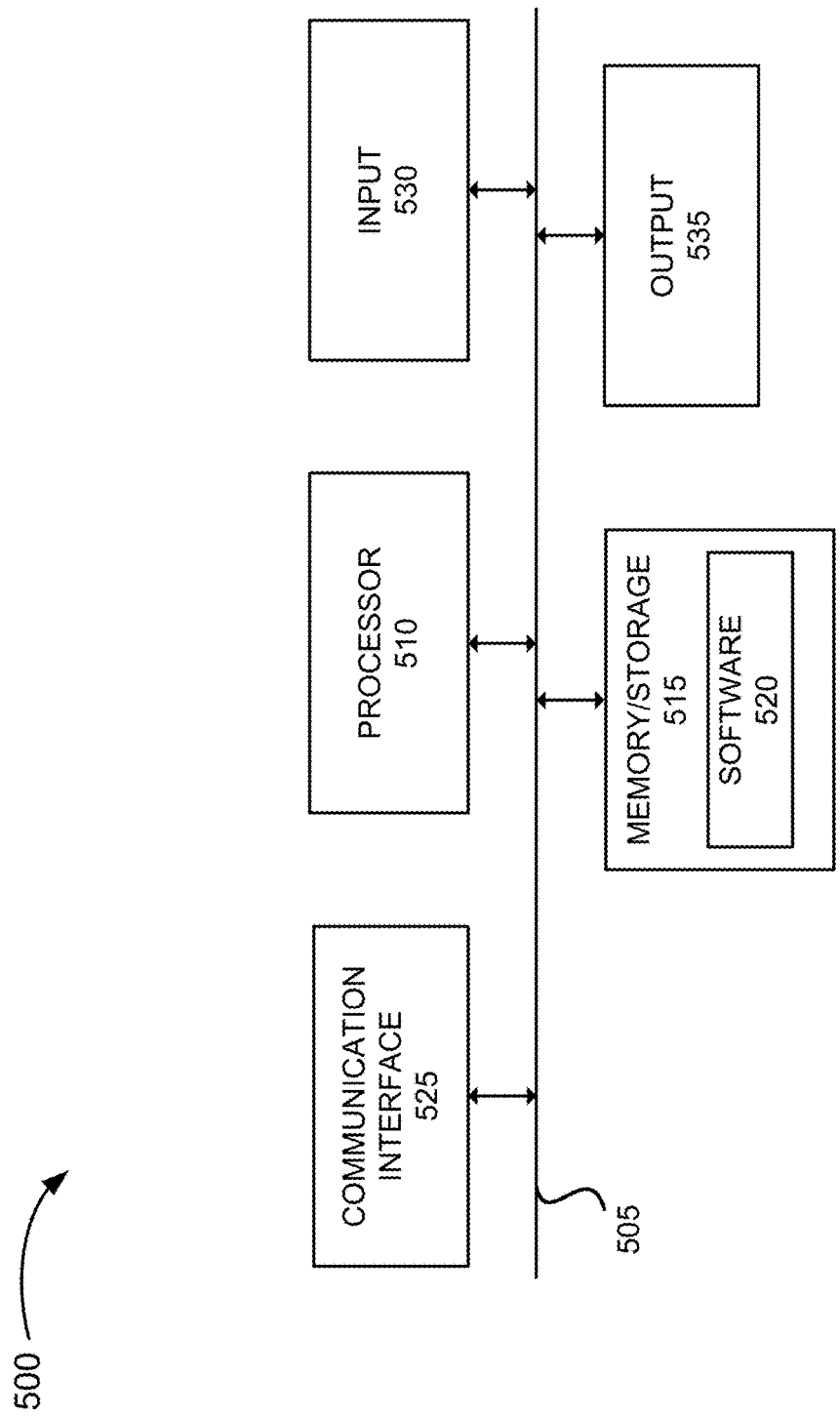

METHOD AND SYSTEM FOR CONTENTION-BASED PROTOCOL AND UNLICENSED BAND USE

BACKGROUND

Development and design of radio access networks (RANs) present certain challenges from a network-side perspective and an end device-side perspective. For example, depending on the configurations from both network-side and end device-side perspectives, such configurations may reduce the effective use of resources. Accordingly, a need exists to overcome these challenges.

BRIEF DESCRIPTION OF THE DRAWINGS

FIG. 5 is a diagram illustrating exemplary components of a device that may correspond to one or more of the devices illustrated and described herein;

DETAILED DESCRIPTION OF PREFERRED EMBODIMENTS

Figure 1:
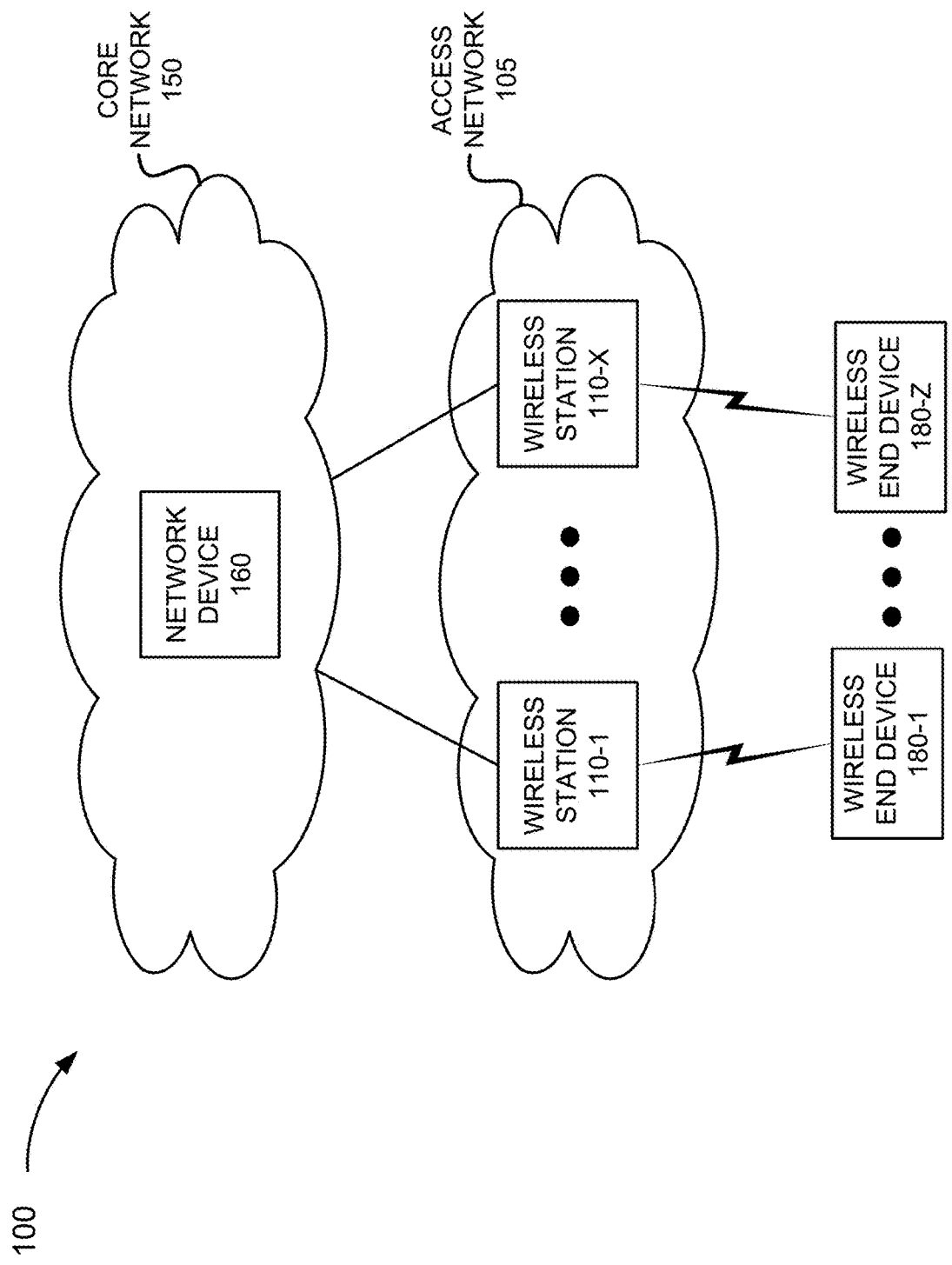
FIG. 1 is a diagram illustrating an exemplary environment in which an exemplary embodiment of a Listen Before Talk (LBT)-based dynamic energy detection service may be implemented.

The following detailed description refers to the accompanying drawings. The same reference numbers in different drawings may identify the same or similar elements. Also, the following detailed description does not limit the invention.

The increase in wireless usage by users has lead to the progression of various technologies, such as carrier aggregation and Long Term Evolution (LTE) operation in the unlicensed spectrum (LTE-U) among others. The use of a combination of licensed radio spectrum and unlicensed radio spectrum is known as Licensed Assisted Access (LAA). While LAA uses only unlicensed spectrum in the downlink through carrier aggregation, other mechanisms have been proposed. For example, enhanced LAA (eLAA) includes uplink operation for LAA, and further eLAA (feLAA) includes proposals relating to channel occupancy time (COT), starting and ending positions in an uplink subframe, etc.

Listen Before Talk (LBT) has been proposed towards the coordination of using both licensed spectrum (e.g., LTE-U, etc.) and unlicensed spectrum (e.g., Wi-Fi, etc.). Typically, LBT uses a Clear Channel Assessment (CCA) procedure before each transmission in the unlicensed spectrum. For example, the CCA procedure includes detecting a threshold energy level on a channel (e.g., energy detection (ED)). The CCA procedure may also include carrier sensing (CS) (e.g., matching a preamble of a received signal with a known training symbol sequence, etc.). LBT may use other types of CCA procedures (e.g., extended or enhanced CAA (eCAA), etc.).

The overall efficiency of LBT rests on the accuracy of detecting how much interference is in the network. Unfortunately, because there is no feedback from a wireless end device, a wireless station may assign resources based on its own perspective relating to interference. However, the presence and/or the amount of interference calculated by the wireless station may be different than the presence and/or the amount of interference experienced by the wireless end device.

According to exemplary embodiments, an LBT-based dynamic energy detection service is described. According to an exemplary embodiment, the LBT-based dynamic energy detection service is provided by a wireless station of a wireless access network. According to an exemplary embodiment, the wireless station determines an energy value of a channel. The wireless station compares the energy value to a threshold energy value. Based on the result of the comparison, the wireless station determines whether to schedule a transmission and/or transmit data via the channel. When the energy value does not satisfy the threshold energy value based on the comparison, the wireless station will wait a threshold period of time. The wireless station may re-measure the energy on the channel or compare again the energy value to the threshold energy value upon expiration of the wait time. On the other hand, when the energy value does satisfy the threshold energy value based on the comparison, the wireless station will schedule the transmission and/or transmit the data via the channel.

According to some exemplary embodiments, subsequent to the expiration of the wait time and successful comparison with the threshold energy value, the wireless station detects a direction of the source of the energy on the channel (e.g., interference), and determines whether the direction is the same as a direction relative to a wireless end device for which the transmission is to be scheduled and/or transmitted, as described herein. According to one exemplary implementation, when the direction is the same, the wireless station resets the wait time and continues to wait. According to other exemplary implementations, the wireless station uses beamforming to minimize the interference and maximize spatial selectivity for the transmission to the wireless end device. The wireless station schedules and transmits the data according to the beamforming configuration.

Additionally, or alternatively, the wireless station may adjust various communication parameter values relating to the transmission of the data to the wireless end device, such as one or more of the data rate, the transmit power, or the modulation scheme. For example, the adjustment to a communication parameter value may be relative to a default parameter value or an established parameter value associated with wireless end device 180. The wireless station schedules and transmits the data according to the adjusted communication parameter value.

When the direction is not the same, the wireless station schedules the transmission of the data to the wireless end device. According to various exemplary implementations, the wireless station may adjust various communication parameters relating to the transmission of the data to the wireless end device, such as the data rate, transmit power, and/or modulation scheme.

According to various exemplary embodiments, the wireless station will determine a data transmission success rate based on an acknowledgement from the end device. For example, the communication of a successful transmission or unsuccessful transmission between the wireless station and the end device may be implemented using Hybrid Automatic Repeat Request (HARD). According to other exemplary implementations, other types of mechanisms may be used (e.g., ARQ, etc.). Depending on the success or lack of success of the transmission, the wireless station applies a positive adjustment or a negative adjustment to the threshold energy level. For example, when the transmission is successful, the wireless station may apply a positive adjustment value that increases the threshold energy level value. By way of further example, if the threshold energy level value is a positive decibel-milliwatt (dBm) value (e.g., 82 dBm or another value) or a negative dBm value (e.g., −75 dBm value or another value), the positive adjustment value may increase the threshold energy level to another positive dBm value (e.g., 84 dBm or another value) or another negative dBm value (e.g., −73 dBm value or another value). Alternatively, when the transmission is unsuccessful, the wireless station may apply a negative adjustment value to decrease the threshold energy level value. By way of further example, if the threshold energy level value is a positive dBm value (e.g., 84 dBm or another value) or a negative dBm value (e.g., −73 dBm value or another value), the negative adjustment value may decrease the threshold energy level to another positive dBm value (e.g., 82 dBm or another value) or another negative dBm value (e.g., −75 dBm value or another value). The positive adjustment value and the negative adjustment value are configurable.

According to an exemplary embodiment, the wireless station manages a threshold energy level for each end device being serviced. For example, the wireless station may store threshold energy level values and correlated data (e.g., end device identifiers, etc.) pertaining to end devices to which the LBT-based dynamic energy detection service applies.

According to an exemplary embodiment, the LBT-based dynamic energy detection service includes resetting the adjustment factor value (e.g., positive adjustment value, negative adjustment value) when there is a change in the radio coverage area (e.g., a cell, a sector of a cell, or other type of wireless service geographic area). For example, when the wireless end device moves to a different cell or sector, causes a handover to take place, or causes another type of alteration of the wireless connection between the wireless station and the wireless end device (e.g., disconnection and reestablishment of the wireless connection, etc.), the adjustment factor value may be reset. For example, the adjustment factor value may be reset to a default adjustment factor value.

As a result, the LBT-based dynamic energy detection service may improve resource utilization from the wireless network-side and the wireless end device side due to the dynamic threshold energy level value. For example, the occurrence of unsuccessful data transmissions may be reduced and the occurrence of successful data transmissions may be increased because the dynamic threshold energy level value takes into account the radio conditions associated with the wireless end device.

FIG. 1 is a diagram illustrating an exemplary environment 100 in which an exemplary embodiment of the LBT-based dynamic threshold energy level service may be implemented. As illustrated, environment 100 includes an access network 105 and a core network 150. Access network 105 may include wireless stations 110-1 through 110-X (referred to collectively as wireless stations 110 and individually (or generally) as wireless station 110), and core network 150 may include a network device 160. Environment 100 further includes wireless end devices 180-1 through 180-Z (referred to collectively as wireless end devices 180 and individually (or generally) as wireless end device 180).

The number, the type, and the arrangement of network devices, and the number of end devices 180 are exemplary. A network device, a network element, or a network function (referred to herein simply as a network device) may be implemented according to one or multiple network architectures (e.g., a client device, a server device, a peer device, a proxy device, a cloud device, a virtualized function, etc). A network device may be implemented according to various computing architectures, such as a centralized computing architecture, a distributed computing architecture, a cloud computing architecture (e.g., an elastic cloud, a private cloud, a public cloud, etc.), or a fog computing architecture.

Environment 100 includes communication links between the networks, between the network devices, and between the network devices and the networks. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Access network 105 may include one or multiple networks of one or multiple types and technologies. For example, access network 105 may include a 4G RAN (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network, an LTE-A Pro, etc.), a future or a next generation RAN (e.g., a 5G-access network (5G-AN) or a 5G-RAN (referred to herein as simply a 5G-RAN)), and/or other types of wireless networks, such as a WiFi network, a Worldwide Interoperability for Microwave Access (WiMAX) network, or another type of wireless network that may be a network edge.

According to various exemplary embodiments, access network 105 may be implemented according to various architectures of wireless service, such as, for example, macrocell, microcell, femtocell, picocell, metrocell, non-cell, or other configuration. Additionally, according to various exemplary embodiments, access network 105 may be implemented according to various wireless technologies (e.g., radio access technologies (RATs)), etc.), wireless standards, and wireless frequencies/bands. For example, access network 105 may be a single RAT (e.g., 4G, 4.5G, 5G, etc.) or a multi-RAT (e.g., Evolved Universal Radio Access-New Radio (E-UTRA-NR) Dual Connectivity (EN-DC) environment, an NR-E-UTRA-DC (NE-DC) environment, a Next Generation (NG) radio access network (RAN) E-UTRA-NR DC (NGEN-DC) environment, etc.).

Access network 105 may be configured to support a DC service. For example, the DC service may include a secondary cell group (SCG) split bearer service, a master cell group (MCG) split bearer, an SCG bearer service, and so forth. Access network 105 may be configured to support a CA service, a network slicing service, or another type of connectivity service. Depending on the implementation, access network 105 may include one or multiple types of wireless stations 110. For example, wireless station 110 may be implemented as a base station (BS), a base transceiver station (BTS), a Node B, an evolved Node B (eNB), a next generation Node B (gNB), an evolved eNB (eLTE eNB), a radio network controller (RNC), a remote radio head (RRH), an RRH and a baseband unit (BBU), a small cell node (e.g., a picocell device, a femtocell device, a microcell device, a home eNB, etc.)), a macrocell node, a metrocell node, a non-cell node, or another type of wireless node (e.g., a WiFi device, a WiMax device, a hot spot device, etc.) that provides a wireless access service. According to various exemplary implementations, wireless station 110 may operate as a standalone network device (e.g., standalone NR, standalone E-UTRA, etc.), a non-standalone network device (e.g., non-standalone NR, non-standalone E-UTRA, etc.), a primary wireless station, a secondary wireless station, or another networked-configuration.

According to various exemplary embodiments, wireless station 110 provides a wireless service to wireless end device 180 via use of radio resources in a licensed spectrum, an unlicensed spectrum, or both, as described herein. In the United States, radio spectrum that is considered licensed versus unlicensed is defined by the U.S. Federal Communications Commission (FCC), while in Europe, the European Telecommunications Standards Institute (ETSI) defines licensed and unlicensed spectrum. According to one example, the unlicensed radio spectrum includes Wi-Fi (e.g., 2.4 GigaHertz (GHz) band, 5 GHz band, 5.8 GHz band, etc.). According to other examples, the unlicensed spectrum may include frequency bands, carrier frequencies, and/or other radio spectrum that is different from the radio spectrum associated with Wi-Fi. According to some examples, the licensed radio spectrum includes radio spectrum allocated for LTE, LTE-A, LTE-A Pro, 5G, and/or a legacy RAN (e.g., a Third Generation (3G) RAN, a 3.5G RAN, a Global System for Mobile Communications (GSM) RAN, a Wideband Code Division Multiple Access (WCDMA) RAN, an Ultra Mobile Broadband (UMB) RAN, a High-Speed Packet Access (HSPA) RAN, an Evolution Data Optimized (EV-DO) RAN, or another type of wireless access network). According to other examples, the licensed spectrum may include frequency bands, carrier frequencies, and/or other radio spectrum that is different from the radio spectrum associated with LTE, LTE-A, 5-G, and so forth.

According to an exemplary embodiment, wireless station 110 includes logic that provides the LBT-based dynamic threshold energy level service, as described herein. According to an exemplary embodiment, wireless station 110 includes logic that increases and decreases a threshold energy level that is used in a CCA procedure based on a success or a lack of success of a data transmission to wireless end device 180. According to an exemplary embodiment, wireless station 110 gauges the success or the failure of a data transmission based on HARQ, ARQ, and/or another type of acknowledgement scheme.

According to an exemplary embodiment, wireless station 110 performs other procedures based on the outcome of the CCA procedure including adjustment of beamforming and/or adjustment of communication parameters (e.g., data rate, transmit power, modulation scheme, etc.) pertaining to the transmission of data to wireless end device 180.

According to an exemplary embodiment, wireless station 110 includes logic that provides an LAA service. According to other exemplary embodiments, wireless station 110 includes logic that provides a carrier aggregation service that is different from LAA (e.g., eLAA, feLAA, etc.).

Core network 150 may include one or multiple networks of one or multiple network types and technologies. Core network 150 may include a complementary network of access network 105. For example, core network 150 may be implemented to include an Evolved Packet Core (EPC) of an LTE network, an LTE-Advanced network, an LTE-Advanced Pro network, a next generation core (NGC) network, and/or a legacy core network. Depending on the implementation of core network 150, core network 150 may include various network devices (illustrated as network device 160), such as for example, a mobility management entity (MME), a packet data network gateway (PGW), a serving gateway (SGW), a home subscriber server (HSS), an authentication, authorization, and accounting (AAA) server, a policy and charging rules function (PCRF), a charging system (CS), a user plane function (UPF), an access and mobility management function (AMF), a session management function (SMF), a unified data management (UDM) device, an authentication server function (AUSF), a network slice selection function (NSSF), a network repository function (NRF), a policy control function (PCF), and so forth. According to other exemplary implementations, core network 150 may include additional, different, and/or fewer network devices than those described.

Wireless end device 180 includes a device that has computational and wireless communication capabilities. Wireless end device 180 may be implemented as a mobile device, a portable device, or a stationary device. Additionally, wireless end device 180 may be operated by a user or not operated by a user. According to various examples, wireless end device 180 may be implemented as a Mobile Broadband device, a Machine Type Communication (MTC) device, an Internet of Things (IoT) device, an enhanced MTC device (eMTC) (also known as Cat-M1), a Narrow-Band IoT (NB-IoT) device, a machine-to-machine (M2M) device, a user device, or other types of wireless end nodes. By way of further example, wireless end device 180 may be implemented as a smartphone, a personal digital assistant, a tablet, a netbook, a phablet, a wearable device, a set top box, an infotainment system in a vehicle, a vehicle support system, a smart television, a game system, a music playing system, or other types of wireless user devices. End device 180 may be configured to execute various types of software (e.g., applications, programs, etc.). The number and the types of software may vary among wireless end devices 180.

According to an exemplary embodiment, wireless end device 180 is configured to communicate with access network 105 using licensed and unlicensed radio spectrum, as described herein. For example, wireless end device 180 may support multiple RATs (e.g., 4G, 5G, WiFi, etc.), multiple frequency bands, and/or multiple carriers. Additionally, wireless end device 180 may include one or multiple communication interfaces that provide one or multiple (e.g., simultaneous) connections via the same or different RATs, frequency bands, carriers, and so forth. The multimode capabilities of wireless end device 180 may vary among wireless end devices 180.

FIGS. 2A-2I are diagrams illustrating an exemplary process of the LBT-based dynamic energy detection service in relation to an exemplary scenario and an exemplary network configuration of access network 105. As illustrated, access network 105 includes eNBs 110-1 through 110-3 (also referred to as eNBs 110 or individually (or generally) as eNB 110) and WiFi devices 110-4 through 110-6 (also referred to as WiFi devices 110 or individually (or generally as WiFi device 110). It may be assumed that eNB 110-1 communicates with wireless end device 180 via a communication link supported by licensed radio spectrum, and WiFi device 110-4 communicates with wireless end device 180 via a communication link supported by unlicensed radio spectrum. The unlicensed radio spectrum may be shared by more than one operator. As further illustrated, it may be assumed that eNBs 110 and WiFi devices 110 are communicatively coupled via communication links. For purposes of description, further assume that each pairing of eNB 110 and WiFi device 110 operates in respective cells 115-1 through 115-3.

According to other exemplary network configurations, access network 105 may include wireless stations 110 of a different type and number as explained herein, as well as different configurations relating to cells, communication links, and so forth.

Figure 2A:
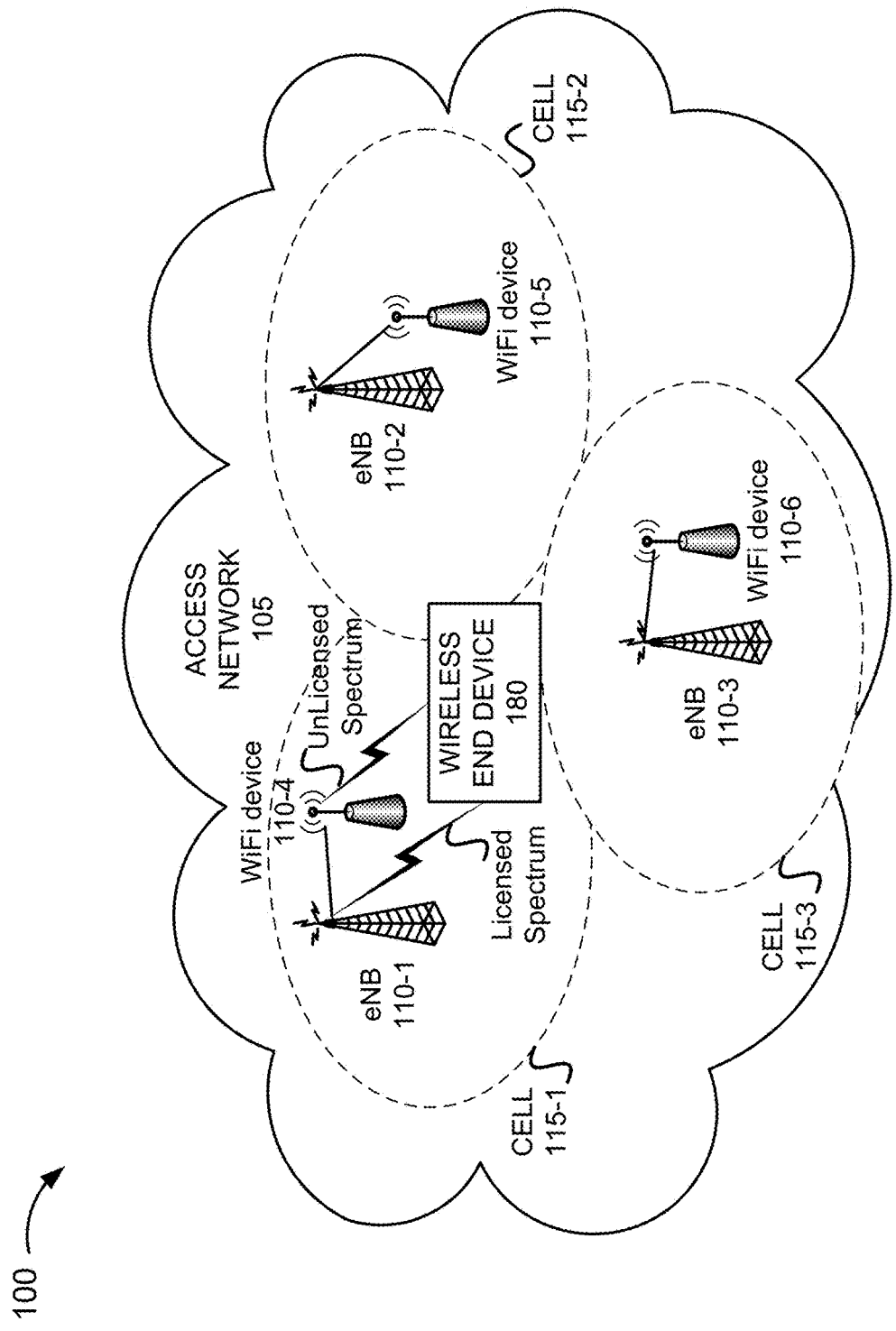
FIGS. 2A-2I are diagrams illustrating an exemplary process of the LBT-based dynamic energy detection service according to an exemplary scenario.
Figure 2B:
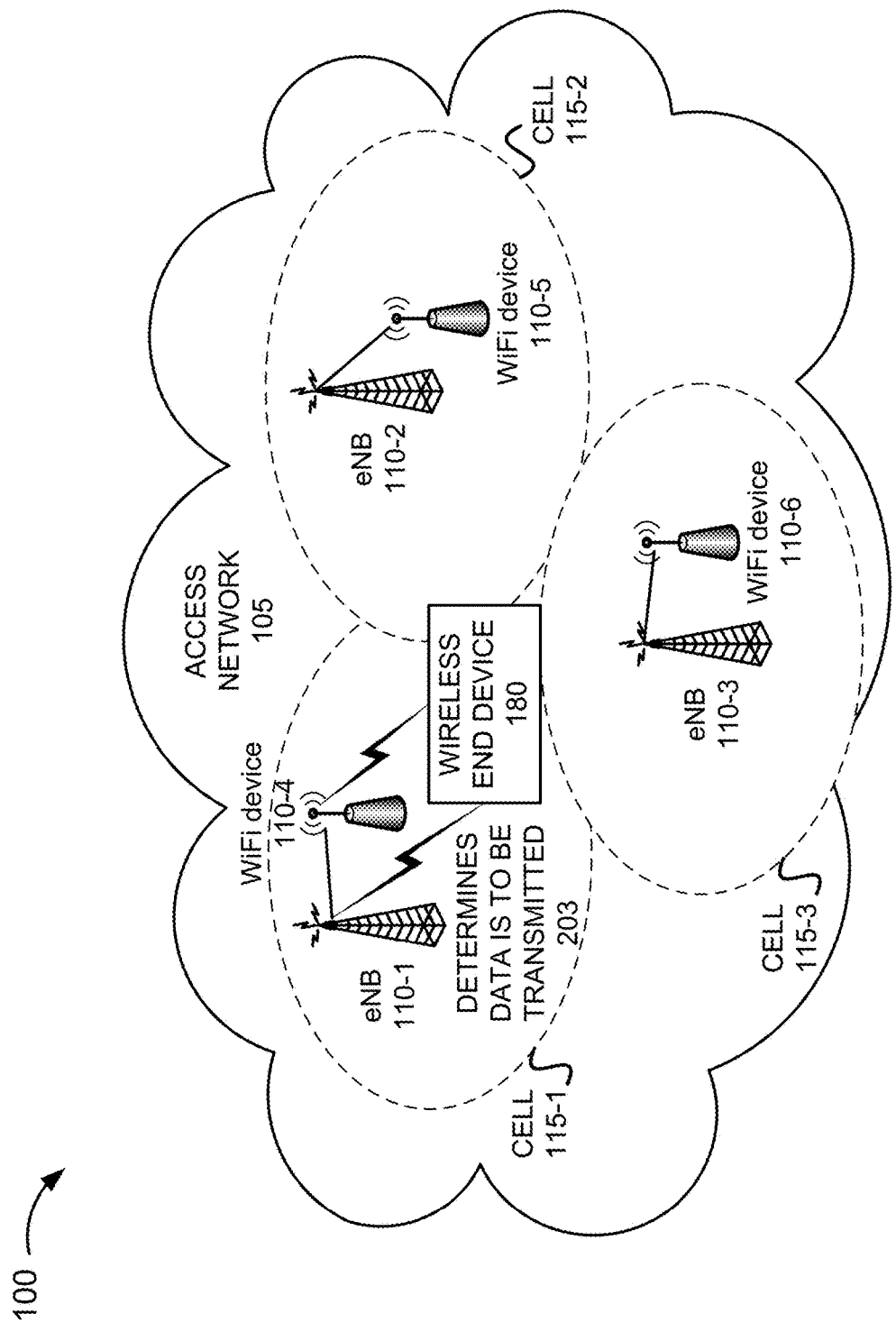
Figure 2C:
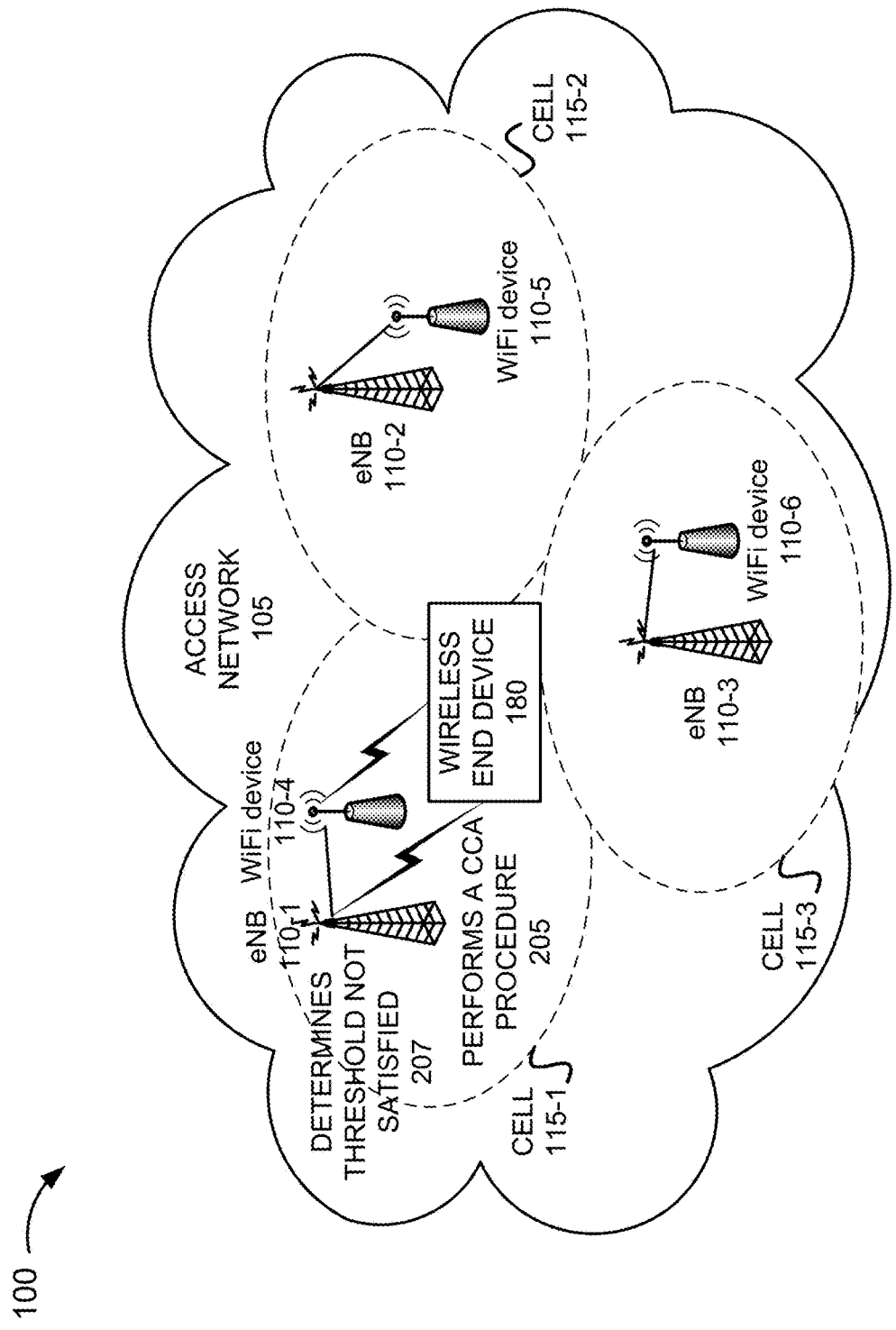

Referring to FIG. 2B, assume that wireless end device 180 is camped in cell 115-1 and communicatively coupled to eNB 110-1 and Wi-Fi device 110-4 in a carrier aggregation context. As illustrated, eNB 110-1 determines that data is to be transmitted 203. For example, eNB 110-1 has data to transmit to wireless end device 180 in the downlink direction. Referring to FIG. 2C, eNB 110-1, in response to the determination that data is to be transmitted, eNB 110-1 performs a CCA procedure. For example, eNB 110-1 measures the energy level on a downlink channel supported by the unlicensed radio spectrum. eNB 110-1 selects a threshold energy level value to use for comparison to the measured energy level value of the channel. According to an exemplary embodiment, eNB 110-1 stores and manages information in support of the LBT-based dynamic energy detection service. eNB 110-1 may use the information to select the threshold energy level.

Figure 3:
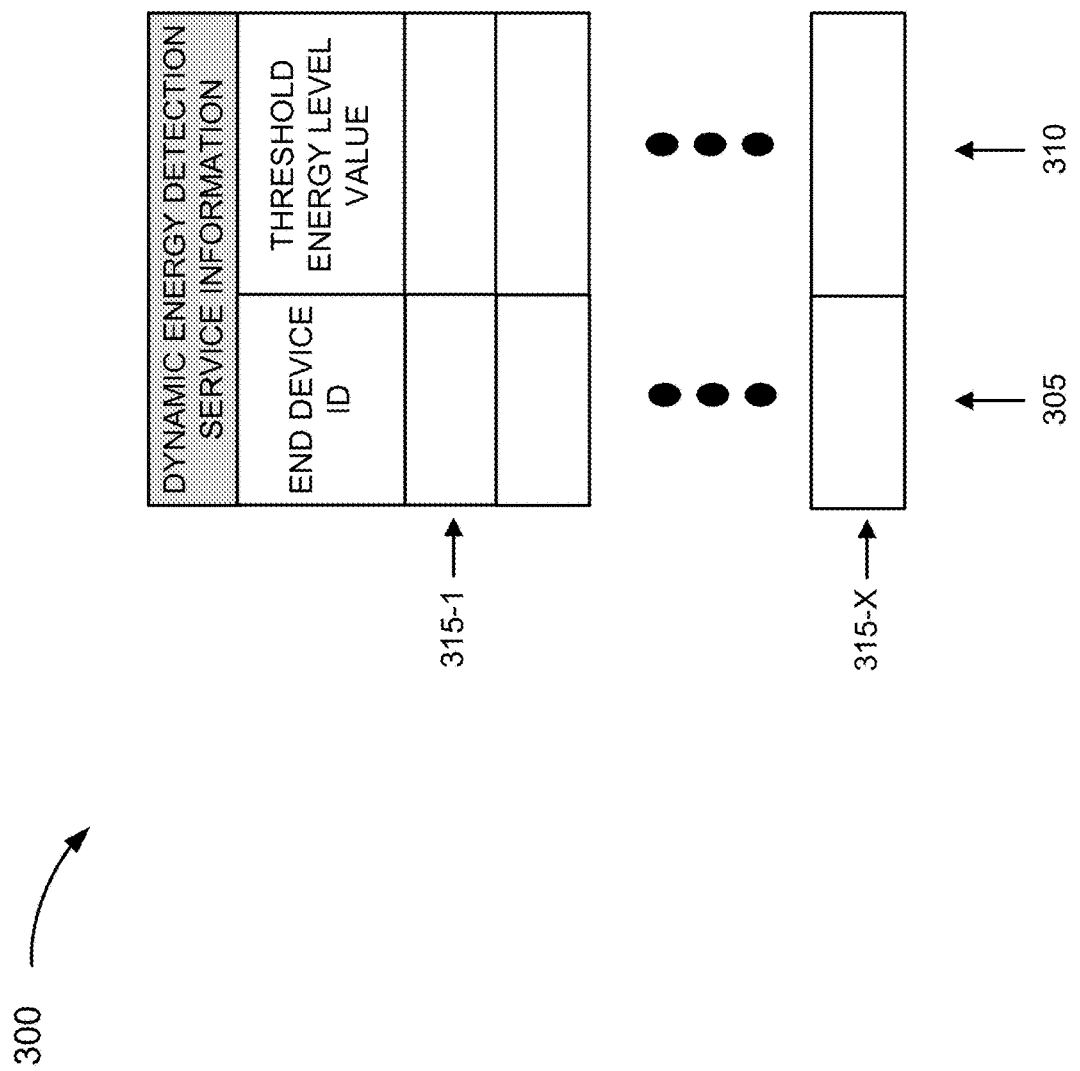
FIG. 3 is a diagram illustrating an exemplary data structure that stores exemplary dynamic energy detection service information.

For example, FIG. 3 is a diagram illustrating exemplary dynamic energy detection service information that may be stored in a table 300. As illustrated, table 300 may include an end device identifier field 305 and a threshold energy level value field 310. As further illustrated, table 300 includes records 315-1 through 315-X that each includes a grouping of fields 305 and 310 that may be correlated. Dynamic energy detection service information is illustrated in tabular form merely for the sake of description. In this regard, dynamic energy detection information may be implemented in a data structure different from a table.

End device ID field 305 may store data indicating an identifier of wireless end device 180 to which the threshold energy level value pertains. For example, the identifier may be an International Mobile Subscriber Identity (IMSI), a Globally Unique Temporary Identifier (GUTI), an International Mobile Station Equipment Identity (IMEI), a Mobile Equipment Identifier (MEID), a Media Access Control (MAC) address, an Internet Protocol (IP) address, or another type of (unique) identifier of wireless end device 180. Additionally, or alternative, end device ID field 305 may store an identifier that identifies a downlink communication path and/or channel to which the threshold energy level value pertains.

Threshold energy level value field 310 may store data that indicates the threshold energy level value. For example, the threshold energy level value may indicate a dBm value or some other unit of measure of power.

According to other exemplary implementations, table 300 may store additional, fewer, and/or different instances of information in support of the LBT-based dynamic energy detection service, as described herein. For example, table 300 may include one or multiple fields that provide information relating to counter information (e.g., number of failed threshold energy level comparisons, number of successful threshold energy level comparisons, etc.), a positive adjustment factor value, a negative adjustment factor value, a data rate, a modulation scheme, a transmit power, a beamforming configuration, direction information relating to interference, and/or a backoff wait time.

Referring to back to FIG. 2C, eNB 110-1 selects the threshold energy level value based on table 300 and the correlated identifier of wireless end device 180 to which the transmission of data in the downlink pertains. eNB 110-1 compares the selected threshold energy level to the measured energy level of the channel, and determines that the threshold energy level is not satisfied 207.

Figure 2D:
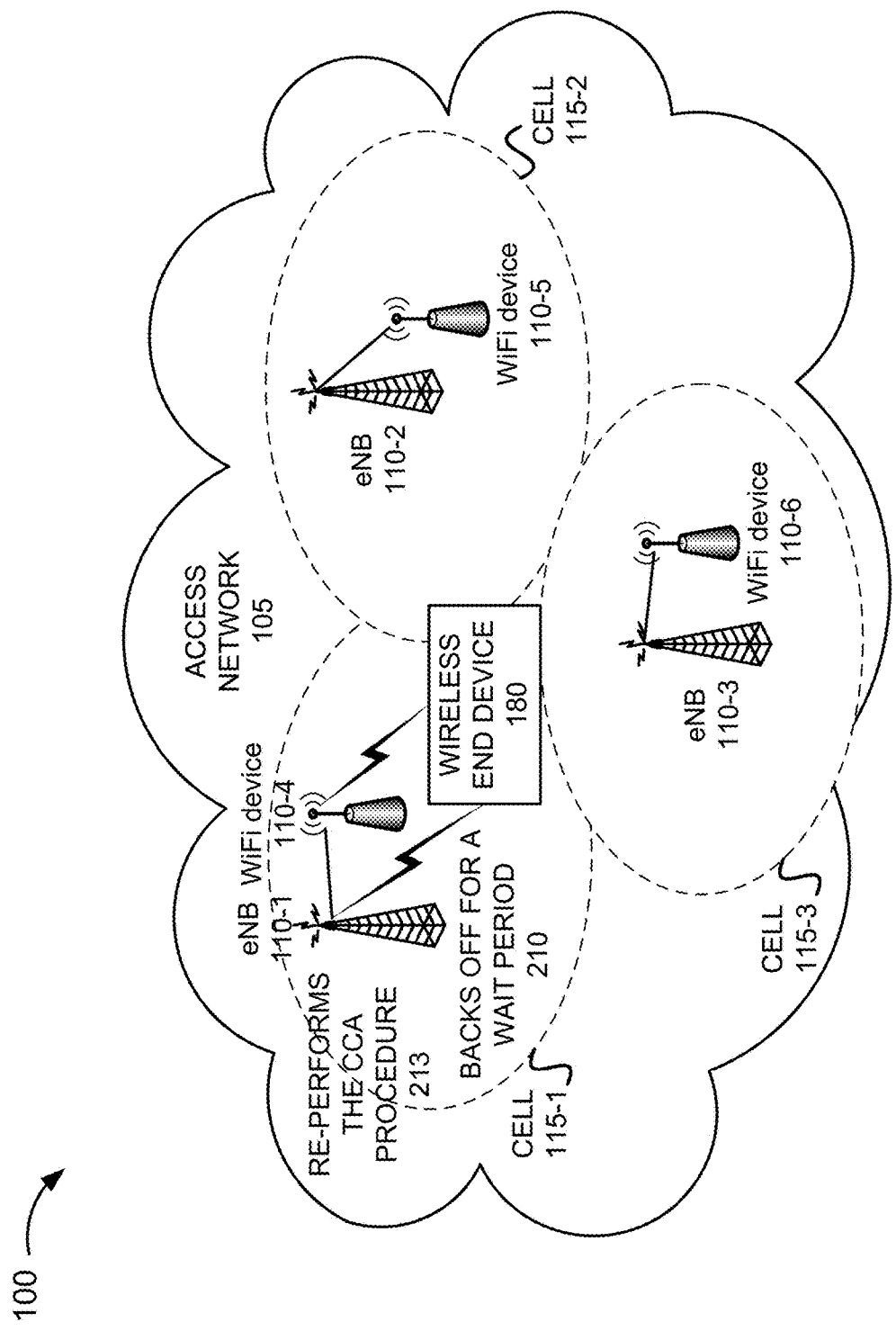

Referring to FIG. 2D, in response to determining that the threshold energy level is not satisfied, eNB 110-1 backs off (e.g., suspends) for a wait period 210 the data transmission. In response to the wait period expiring, eNB 110-1 performs the CCA procedure 213 again. For example, eNB 110-1 may measure the energy level of the channel supported by the unlicensed radio spectrum. eNB 110-1 compares the measured energy level value to the selected threshold energy level value.

Figure 2E:
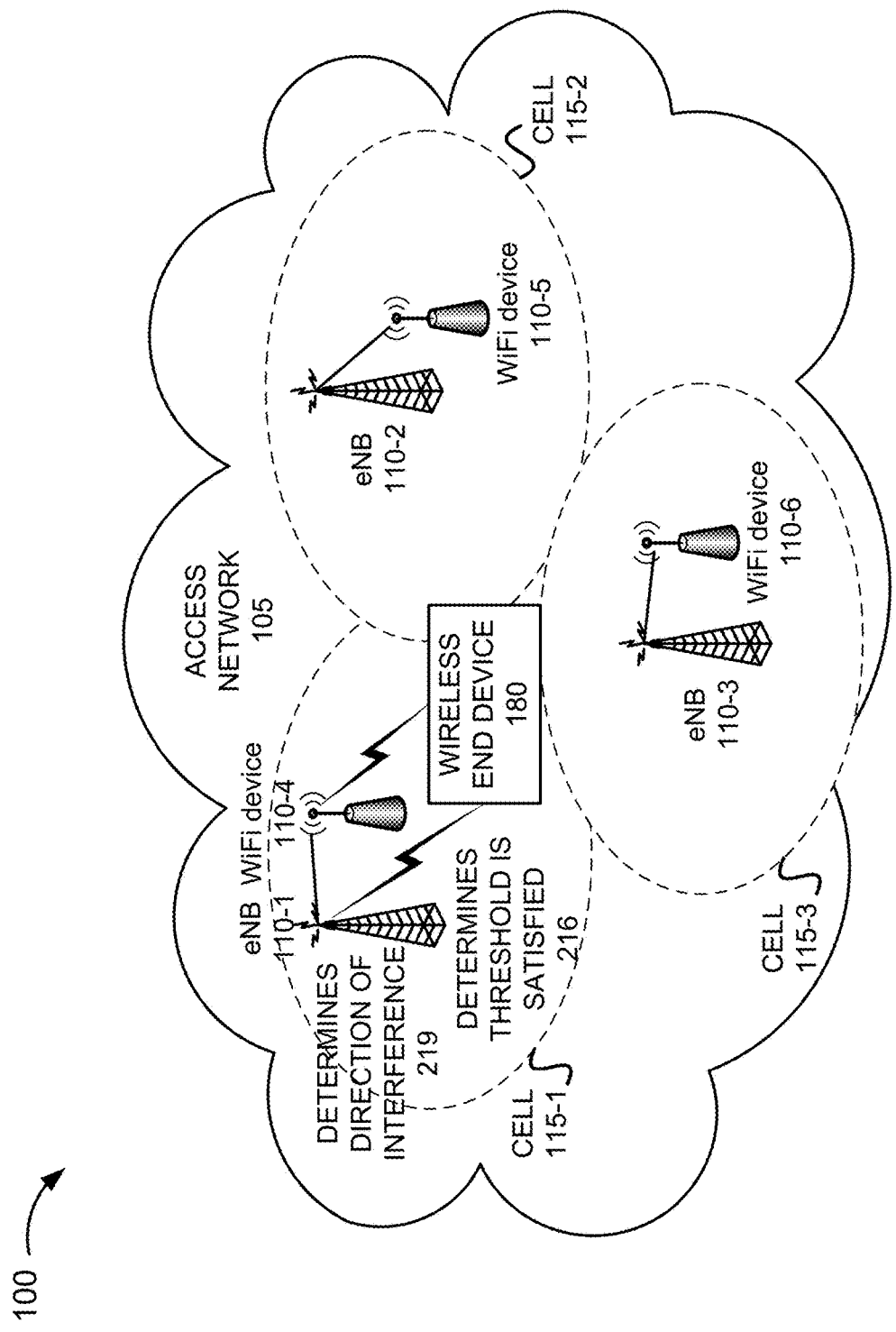
Figure 2F:
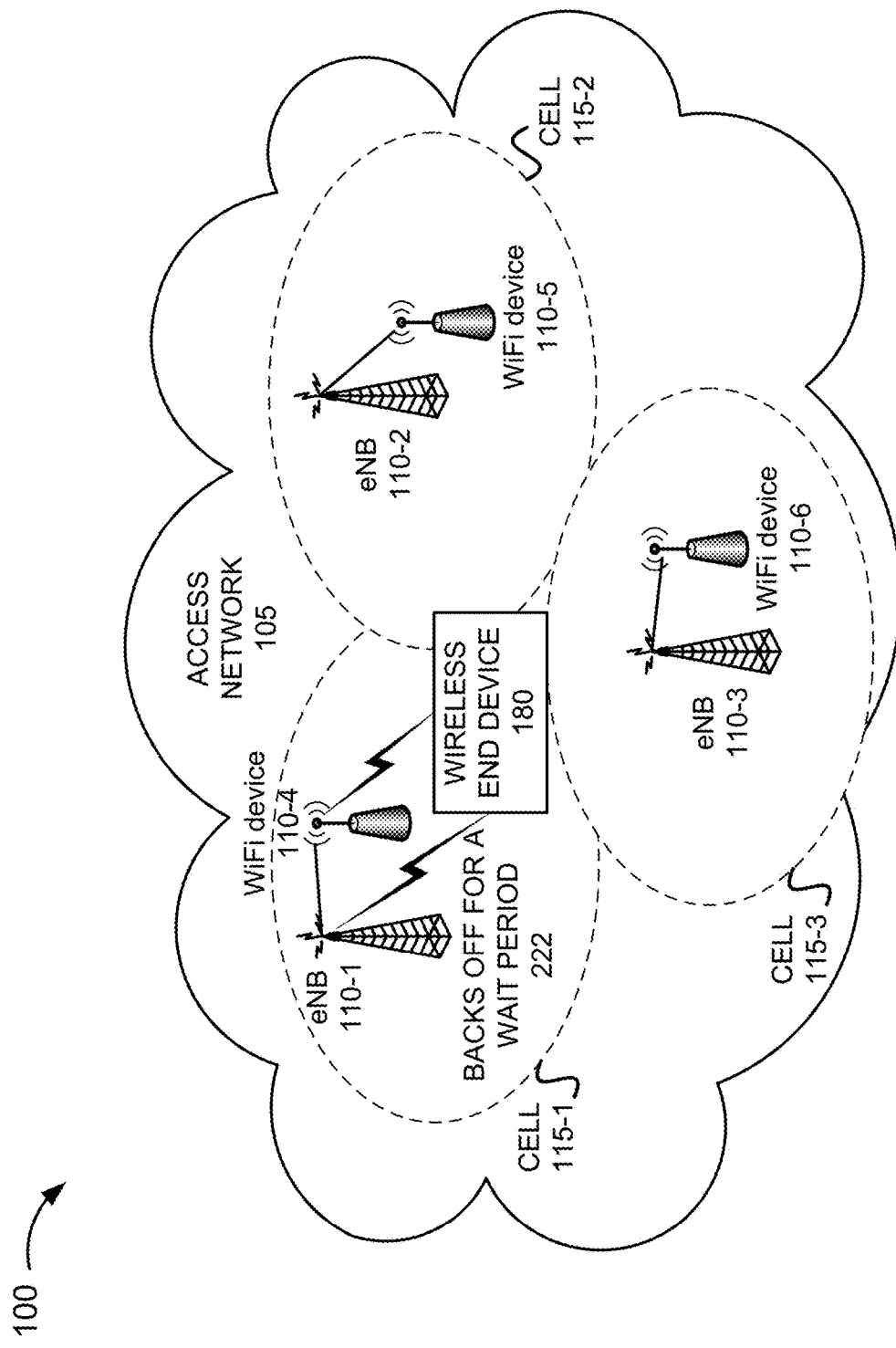
Figure 2G:
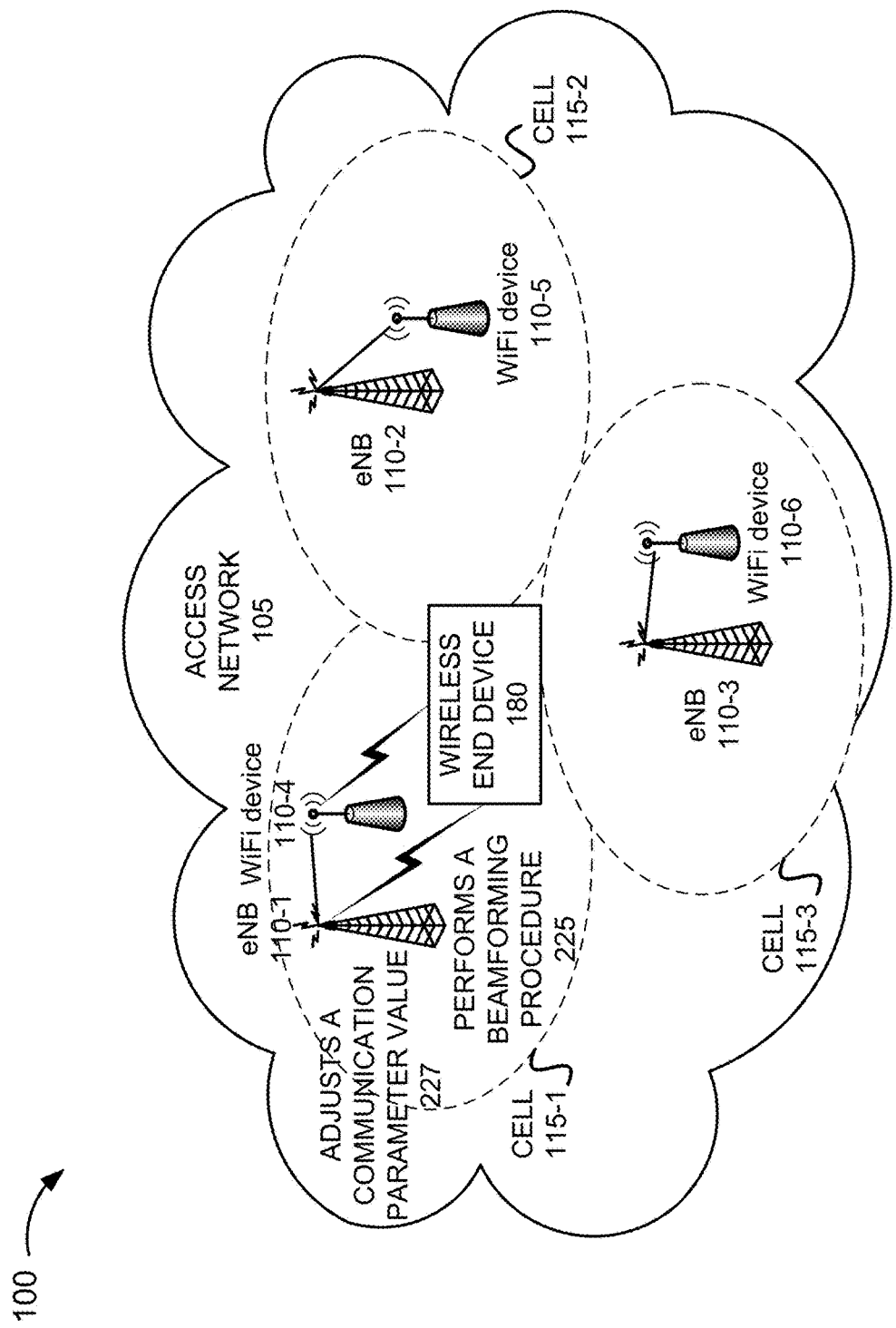
Figure 2H:
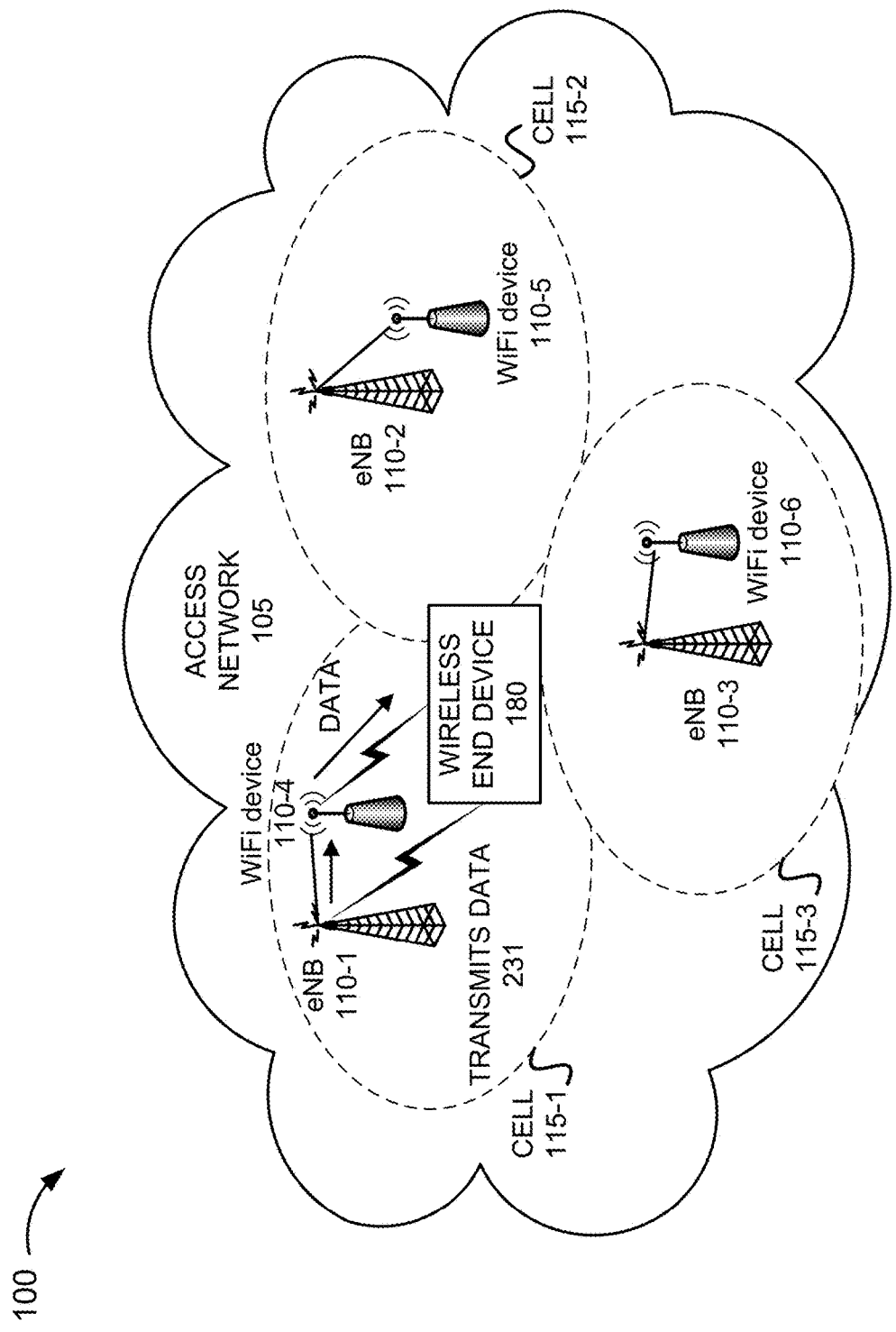

Referring to FIG. 2E, eNB 110-1 determines that the measured energy level value now satisfies the selected threshold energy level value 216. According to an exemplary embodiment, in response to this determination, eNB 110-1 determines the direction of the interference 219 using the receive antenna from which the channel was measured. For example, the location of the source of the measured energy level may be determined in relation to the location of wireless end device 180 to which the transmission of data pertains. According to an exemplary implementation, when the direction of the source of the measured energy level is the same as the direction related to wireless end device 180, eNB 110-1 backs off for a wait period 222, as illustrated in FIG. 2F. Referring to FIG. 2G, according to another exemplary implementation, when the direction of the source of the measured energy level is the same as the direction related to wireless end device 180, eNB 110-1 performs a beamforming procedure 225. For example, eNB 110-1 may include logic that calculates the spatial locale of the source of the measured energy level and the spatial locale of wireless end device 180. In view of these calculations, eNB 110-1 may identify one or multiple antennas for transmission of the data that minimizes interference from the source. According to still another exemplary implementation, when the direction of the source of the measured energy level is the same as the direction related to wireless end device 180, eNB 110-1 may adjust one or multiple communication parameter values pertaining to the transmission of data to wireless end device 180. For example, eNB 110-1 may adjust one or more of the data rate, the transmit power, or the modulation scheme (e.g., relative to a default parameter value or an established parameter value). Referring to FIG. 2H, eNB 110-1 may transmit the data 231 to wireless end device 180.

Referring back to FIG. 2E in relation to determining the direction of the interference 219, when eNB 110-1 determines that the direction of the source of the measured energy level is different from the direction related to wireless end device 180, eNB 110-1 adjusts the communication parameter value 227, as illustrated in FIG. 2G. Alternatively, according to another exemplary implementation, eNB 110-1 may not adjust the communication parameter value 227, and transmit the data 231, as illustrated in FIG. 2H.

Figure 2I:
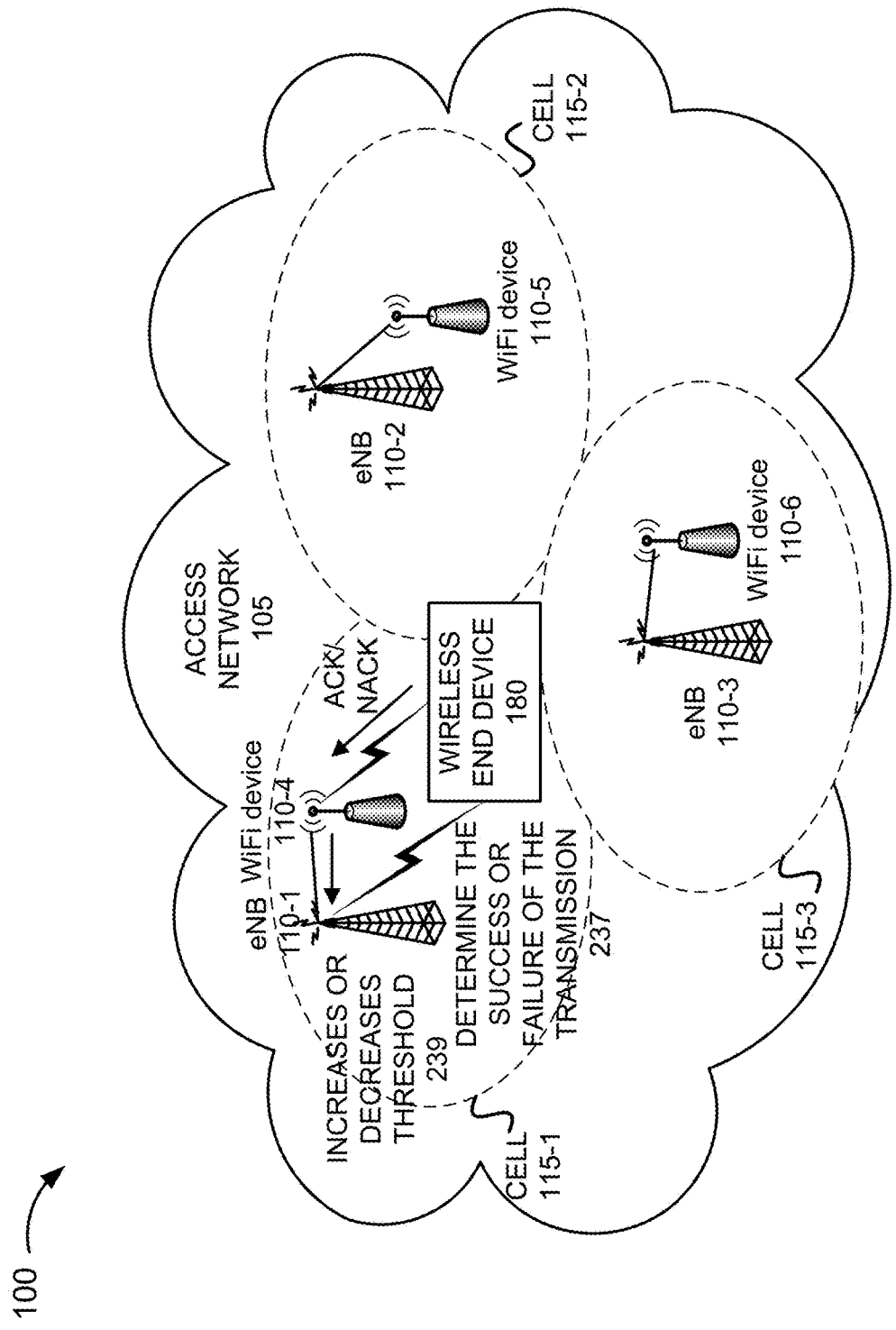

Referring to FIG. 2I, subsequent to the transmission of the data, eNB 110-1 determines the success or failure of the data transmission 237. For example, eNB 110-1 uses the acknowledgement (ACK) or non-acknowledgment (NACK) received from wireless end device 180 as a basis to determine the success or failure of the transmission. Based on the receipt of the ACK or NACK, eNB 110-1 increases or decreases the threshold energy level value 239. For example, when the transmission is a success, eNB 110-1 decreases the threshold energy level value according to a negative adjustment value. By way of further example, if the negative adjustment value is 2 dBm and the current threshold energy level value is −116 dBm, eNB 110-1 will adjust the threshold energy level value to −118 dBm. Conversely, if the negative adjustment value is 2 dBm and the current threshold energy level value is 85 dBm, eNB 110-1 will adjust the threshold energy level value to 83 dBm.

On the other hand, when the transmission is a failure, eNB 110-1 increases the threshold energy value according to a positive adjustment value. By way of further example, if the positive adjustment value is 2 dBm and the current threshold energy level value is −116 dBm, eNB 110-1 will adjust the threshold energy level value to −114 dBm. Conversely, if the positive adjustment value is 2 dBm and the current threshold energy level value is 85 dBm, eNB 110-1 will adjust the threshold energy level value to 87 dBm. The values described are merely exemplary and stated for purposes of description. eNB 110-1 may update and store a new threshold energy level value in table 300.

According to an exemplary embodiment, the negative adjustment value and the positive adjustment value are static values. According to another exemplary embodiment, the negative adjustment value and the positive adjustment value are dynamic values. For example, the negative adjustment value and the positive adjustment value may change in value depending on the number of consecutive successes or failures of data transmissions. Additionally, or alternatively, the negative adjustment value and the positive adjustment value may be limited to values within a certain range of values.

While FIGS. 2A-2I illustrate exemplary processes of the LBT-based dynamic energy detection service, according to other embodiments, wireless station 110 of access network 105, may perform additional, different, and/or fewer steps or processes in support of the service.

Figure 4B:
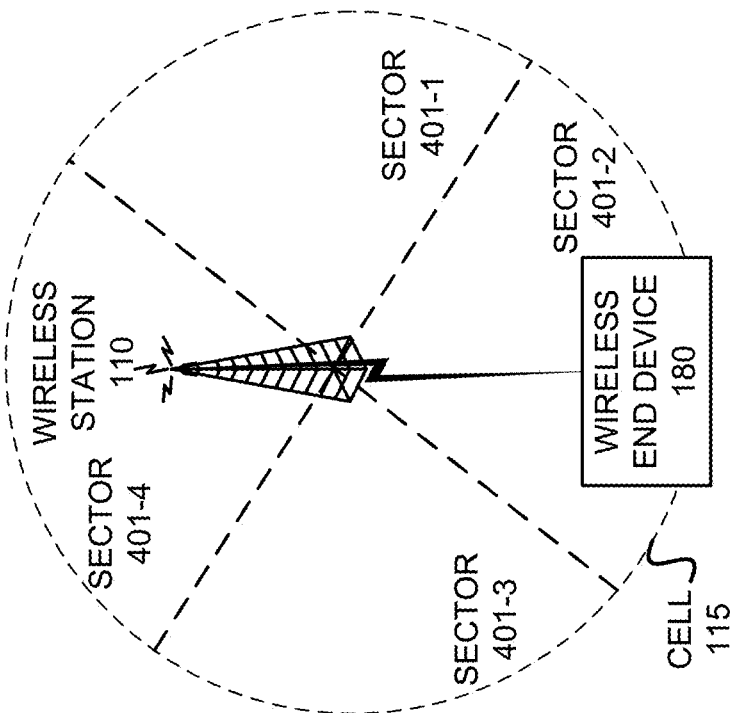
FIGS. 4A-4D are diagram illustrating other exemplary processes of exemplary embodiments of the LBT-based dynamic energy detection service.
Figure 4A:
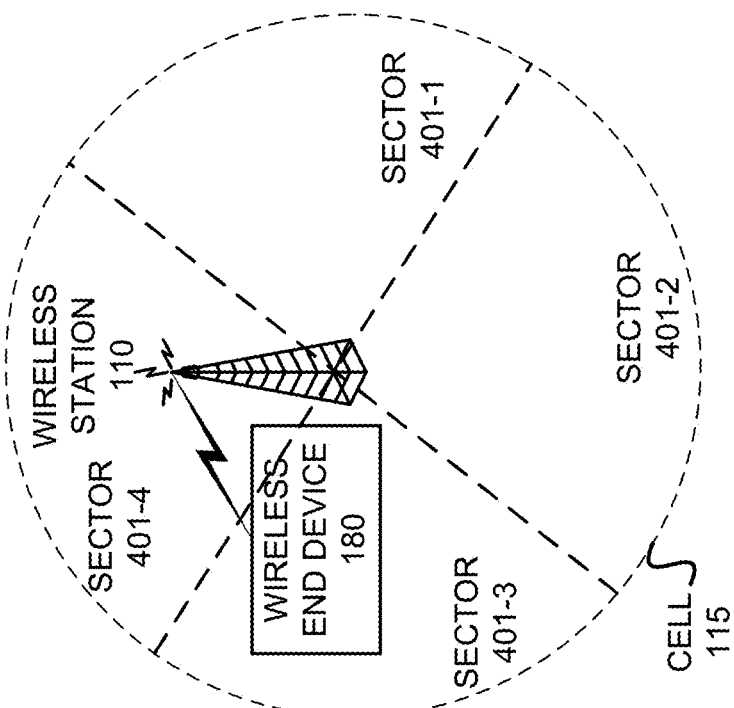

FIGS. 4A and 4B are diagrams illustrating another exemplary process of the LBT-based dynamic energy detection service. According to this exemplary scenario, assume that wireless end device 180 has a radio connection with wireless station 110 supported by unlicensed radio spectrum. Further assume that wireless station 110 provides a wireless service associated with cell 115 that includes sectors 401-1 through 401-4 (also referred to as sectors 401, or generally or individually as sector 401). As illustrated, wireless end device 180 is situated in sector 401-3.

According to an exemplary embodiment, wireless station 110 may reset the threshold energy level value based on change of location of wireless end device 180. For example, referring to FIG. 4B, wireless end device 180 may move from sector 401-3 to sector 180-2. In response to the detection of the change of location by wireless end device 180 (sector-wise), wireless station 110 may reset the threshold energy level value to a default threshold energy level value. According to another example, wireless station 110 may reset the threshold energy level value when a timing advance parameter value changes equal to or greater than a threshold timing advance parameter value. For example, referring to FIGS. 4A and 4B, the location of wireless end device 180 changes from being close to wireless station 110 to being farther from wireless station 110 (e.g., near the edge of cell 115). According to other examples, the timing advance parameter value may change without the change in location of wireless end device 180 relative to wireless station 110 including a change in sector 401. That is, wireless station 110 may reset the threshold energy level value even though wireless end device 180 has not changes sectors 401. According to other exemplary implementations, the trigger to reset the threshold energy level value may depend on multiple triggering events, such as detection that data is to be transmitted to wireless end device 180 and detection that the location of wireless end device 180 has changed (e.g., a change in sector 401, a change in the timing advance parameter value, etc.).

Figures 4C, 4D:
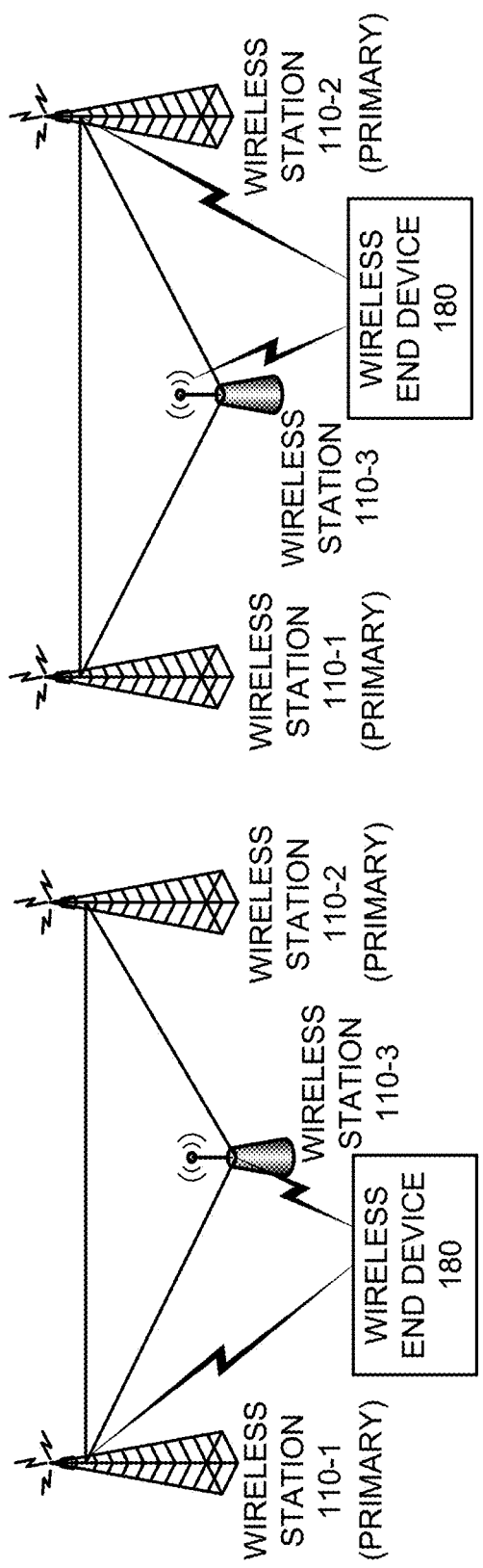

FIGS. 4C and 4D are diagrams illustrating yet another exemplary process of the LBT-based dynamic energy detection service. According to this exemplary scenario, assume that a handover procedure is performed between wireless station 110-1 and 110-2. According to some examples, wireless stations 110-1 and 110-2 may each be considered a primary cell of a cell group. The cell group may include one or multiple wireless stations 110. According to this example, wireless station 110-3 may be considered a secondary cell.

According to an exemplary embodiment, subsequent to the handover procedure, wireless station 110-2 may use a default threshold energy level value during a CCA procedure, regardless of the threshold energy level value used by wireless station 110-1 prior to the execution of the handover procedure or during the handover. According to other exemplary embodiments, although not illustrated, wireless station 110-1 may transmit dynamic energy detection service information to wireless station 110-2. Wireless station 110-2 may store and use this information as a basis for providing the LBT-based dynamic energy detection service.

FIG. 5 is a diagram illustrating exemplary components of a device 500 that may be included in one or more of the devices described herein. For example, device 500 may correspond to components included in wireless station 110, network device 160, and wireless end device 180. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, etc.

Memory/storage 515 includes one or multiple memories and/or one or multiple other types of storage mediums. For example, memory/storage 515 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 515 may include a hard disk (e.g., a magnetic disk, an optical disk, a magneto-optic disk, a solid state disk, etc.), a Micro-Electromechanical System (MEMS)-based storage medium, and/or a nanotechnology-based storage medium.

Memory/storage 515 may include drives for reading from and writing to the storage medium.

Memory/storage 515 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 515 may store data, software, and/or instructions related to the operation of device 500.

Software 520 includes an application or a program that provides a function and/or a process. As an example, with reference to wireless station 110, software 520 may include an application that, when executed by processor 510, provides a function of the LBT-based dynamic energy detection service, as described herein. Software 520 may also include firmware, middleware, microcode, hardware description language (HDL), and/or other form of instruction. Software 520 may further include an operating system (OS) (e.g., Windows, Linux, Android, proprietary, etc.).

Communication interface 525 permits device 500 to communicate with other devices, networks, systems, and/or the like. Communication interface 525 includes one or multiple wireless interfaces and/or wired interfaces. For example, communication interface 525 may include one or multiple transmitters and receivers, or transceivers. Communication interface 525 may operate according to a protocol stack and a communication standard. Communication interface 525 may include an antenna. Communication interface 525 may include various processing logic or circuitry (e.g., multiplexing/de-multiplexing, filtering, amplifying, converting, error correction, application programming interface (API), etc.). Communication interface 525 may be implemented as a point-to-point interface, a service based interface, etc.

Input 530 permits an input into device 500. For example, input 530 may include a keyboard, a mouse, a display, a touchscreen, a touchless screen, a button, a switch, an input port, speech recognition logic, and/or some other type of visual, auditory, tactile, etc., input component. Output 535 permits an output from device 500. For example, output 535 may include a speaker, a display, a touchscreen, a touchless screen, a light, an output port, and/or some other type of visual, auditory, tactile, etc., output component.

As previously described, a network device may be implemented according to various computing architectures (e.g., centralized, distributed, etc.) and according to various network architectures (e.g., a virtualized function, a client device, etc.). Device 500 may be implemented in the same manner. For example, device 500 may be instantiated, spun up, spun down, etc., using well-known virtualization techniques in a public/private cloud or other type of network.

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a process described herein. Alternatively, for example, according to other implementations, device 500 performs a process described herein based on the execution of hardware (processor 510, etc.).

Figure 6:
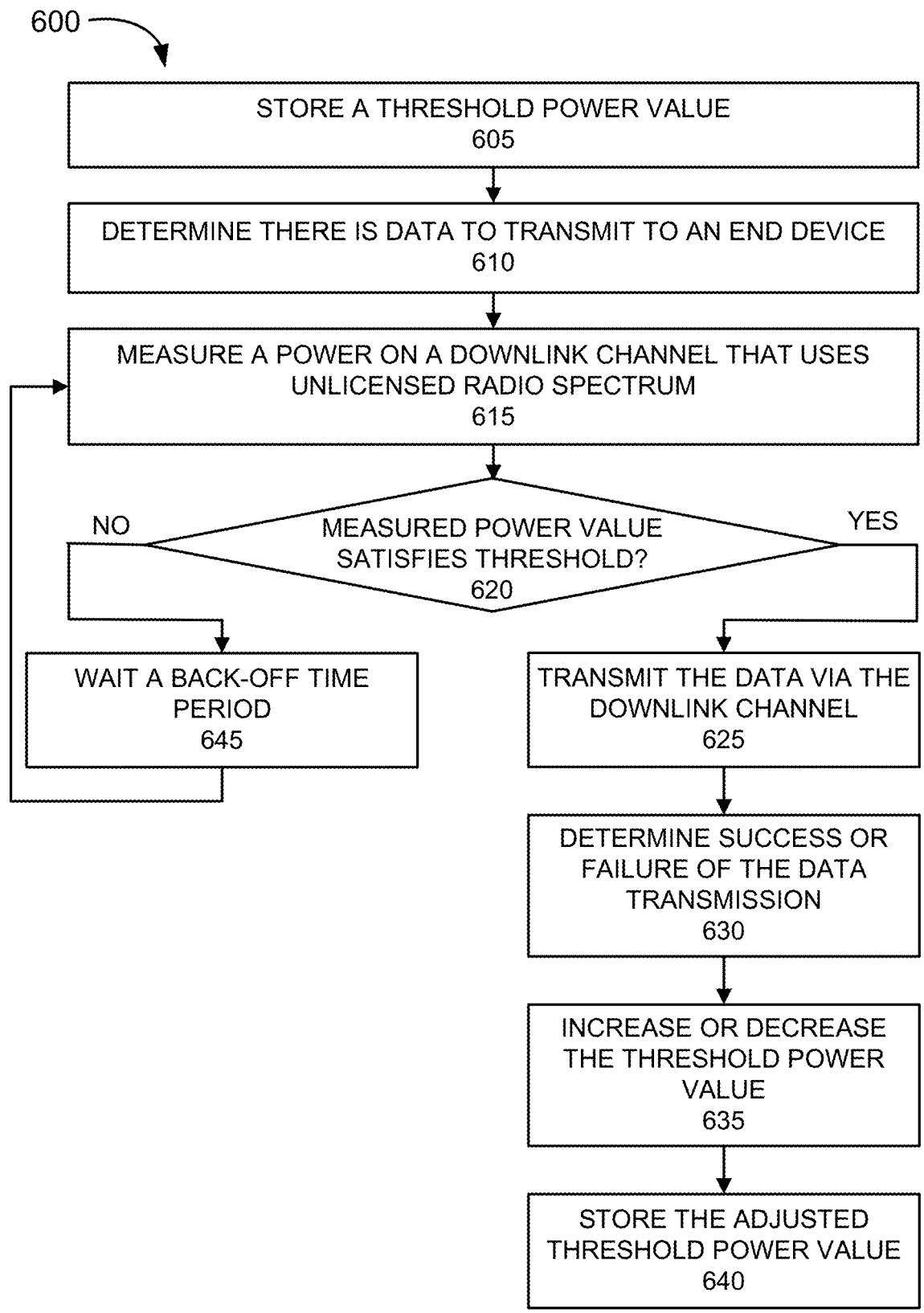
FIG. 6 is a flow diagram illustrating an exemplary process of an exemplary embodiment of the LBT-based dynamic energy detection service.

FIG. 6 is a flow diagram illustrating an exemplary process 600 of an exemplary embodiment of the LBT-based dynamic energy detection service. According to an exemplary embodiment, wireless station 110 performs steps of process 600. For example, processor 510 executes software 520 to perform the step illustrated in FIG. 6, and described herein. It may be assumed that wireless end device 180 is attached to wireless station 110, and unlicensed radio spectrum is used to support downlink transmission of user plane data to wireless end device 180.

Referring to FIG. 6, in block 605, dynamic energy detection service information that includes a threshold power value is stored. For example, wireless station 110 may store an end device identifier and the threshold power value. Wireless station 110 may store other types of information (e.g., counter values, etc), as described herein.

In block 610, it is determined that there is data to be transmitted to an end device. For example, wireless station 110 may receive data from core network 150 that is to be transmitted to wireless end device 180.

In block 615, a power on a downlink channel that uses unlicensed radio spectrum is measured. For example, wireless station 110 may perform a CCA procedure that listens for energy of unlicensed radio spectrum on a downlink channel that can be used to transmit the data to wireless end device 180. Wireless station 110 may determine a measured power level for the downlink channel based on the listening.

In block 620, it is determined whether the measured power level satisfies the threshold power value. For example, wireless station 110 compares the measured power level and the threshold power value. Based on a result of the comparison, wireless station 110 determines whether the measured power level satisfies (e.g., is equal to or greater than) the threshold power value.

When it is determined that the measured power value satisfies the threshold power value (block 620—YES), the data is transmitted via the downlink channel (block 625). For example, wireless station 110 transmits the data to wireless end device 180 using the unlicensed radio spectrum.

In block 630, the success of the failure of the data transmission is determined. For example, wireless station 110 may receive an ACK or an NACK from wireless station that indicate whether the data transmitted was successful or not.

In block 635, the threshold power value may be increased or decreased. For example, in response to determining the success or the failure of the data transmission, wireless station 110 may apply a positive adjustment value or a negative adjustment value to the threshold power value, as previously described. Based on these values, wireless station 110 calculates an adjusted threshold power value.

In block 640, the adjusted threshold power value is stored. For example, wireless station 110 may update the threshold power value as the adjusted threshold power value.

When it is determined that the measured power value does not satisfy the threshold power value (block 620—NO), a back-off time period is used (block 645). For example, wireless station 110 may wait a time period before attempting to transmit the data or measure again the power on the downlink channel. As illustrated, upon expiration of the back-off time period, process 600 may continue to block 615.

Although FIG. 6 illustrates an exemplary process 600 of the service, according to other embodiments, process 600 may include additional operations, fewer operations, and/or different operations than those illustrated in FIG. 6, and described herein. For example, the threshold power value may have a maximum upper value and a maximum lower value. According to such an exemplary implementation, wireless station 110 may determine whether the application of the adjustment value to the threshold power value will cause the threshold power value to exceed the configured range of values designated for the threshold power value.

Figure 7A:
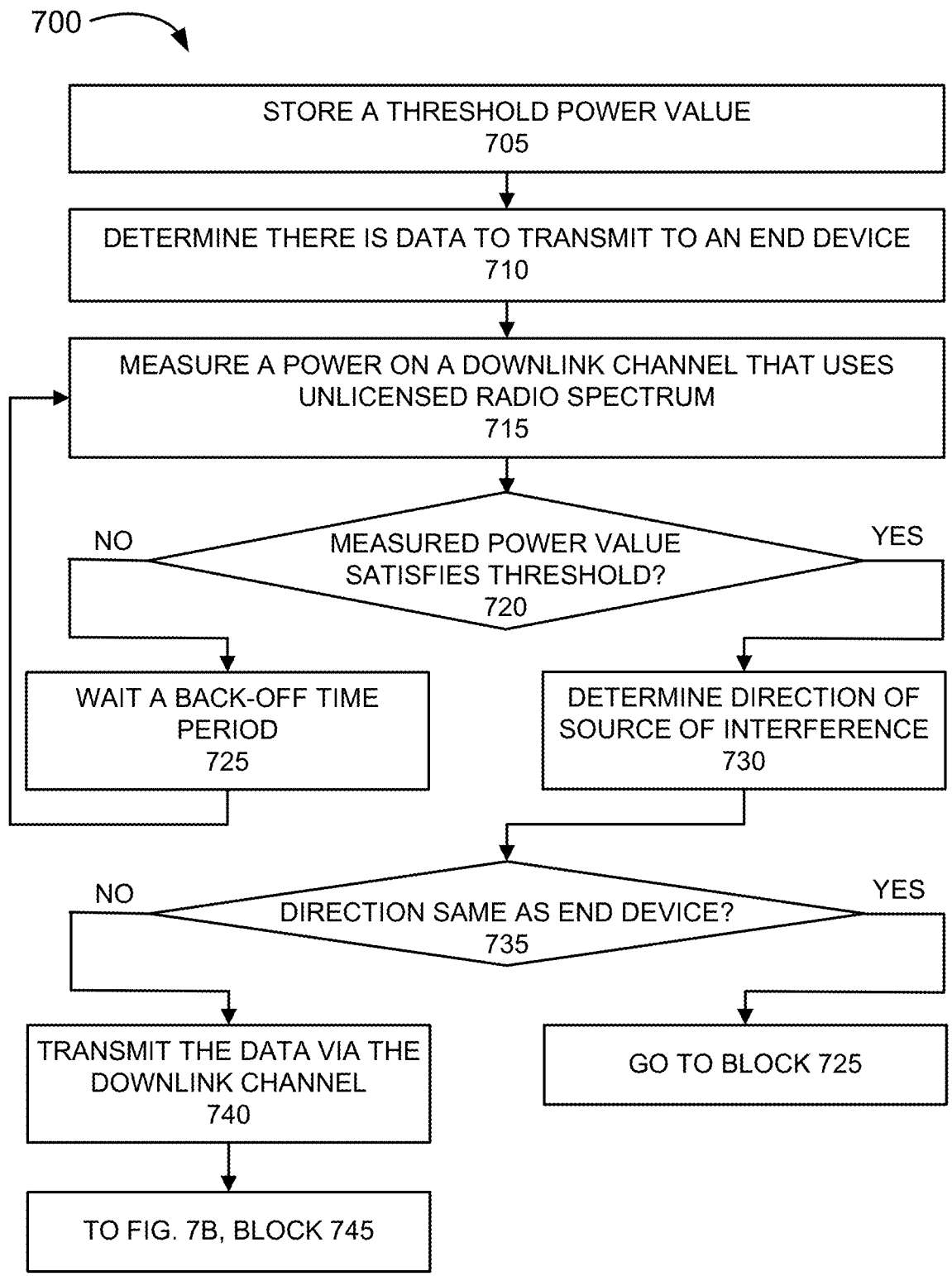
FIGS. 7A and 7B are flow diagrams illustrating another exemplary process of an exemplary embodiment of the LBT-based dynamic energy detection service.
Figure 7B:
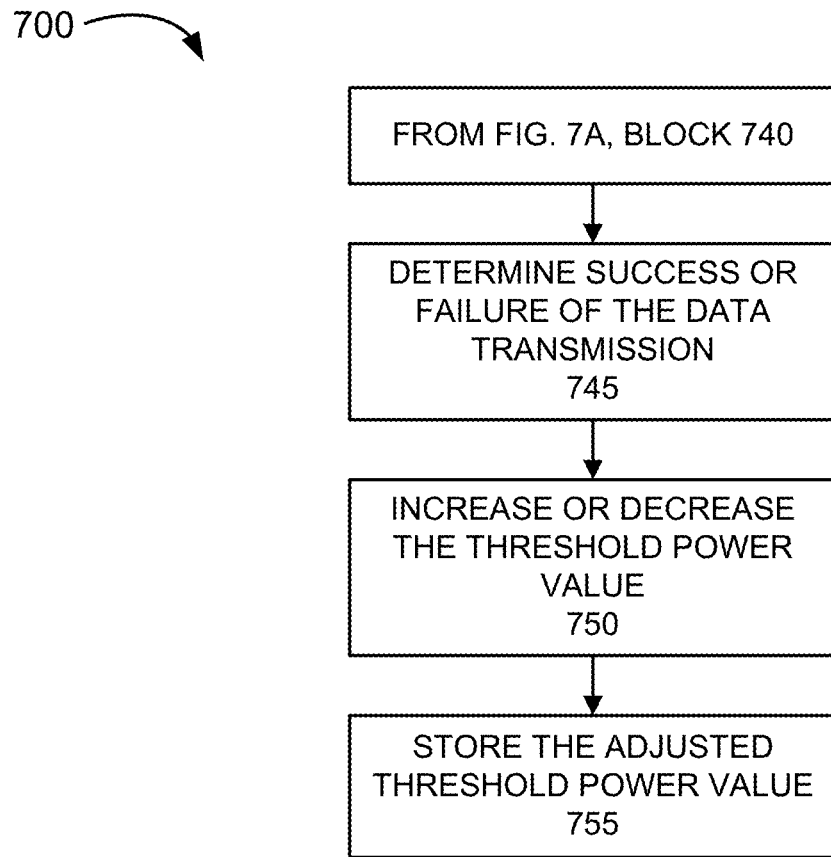

FIGS. 7A and 7B are flow diagrams illustrating another exemplary process 700 of an exemplary embodiment of the LBT-based dynamic energy detection service. According to an exemplary embodiment, wireless station 110 performs steps of process 700. For example, processor 510 executes software 520 to perform the step illustrated in FIGS. 7A and 7B, and described herein. It may be assumed that wireless end device 180 is attached to wireless station 110, and unlicensed radio spectrum is used to support downlink transmission of user plane data to wireless end device 180.

Referring to FIG. 7A, blocks 705 through 725 are similar to blocks 605 through 620 and block 645 of FIG. 6. Accordingly, for the sake of brevity, blocks 705 through 725 will not be described.

When it is determined that the measured power value satisfies the threshold power value (block 720—YES), a direction of the source of the interference is determined (block 730). For example, wireless station 110 may perform a beamforming procedure that calculates the spatial locale of the source of the measured energy value. By way of further example, wireless station 110 may use a beamforming algorithm in the frequency domain (e.g., Bartlett beamforming, Frequency Domain Beamforming (FDBF)), a deconvolution method (e.g., Deconvolution Approach for the Mapping of Acoustic Sources (DAMAS)), an adaptive beamforming method (e.g., Capon, Maximum Likelihood, Minimum Variance, etc.), or other known techniques and algorithms in support of beamforming or spatial filtering (e.g., blind or non-blind adaptive algorithms, etc.). According to various exemplary implementations, wireless station 110 may include a smart antenna, a MIMO antenna, a phased array, or another type of antenna array. According to various exemplary implementations, wireless station 110 may also use various types of beamforming technologies, such as switched array antenna (e.g., switching on/off an antenna selectively from an array of an antenna system), beamforming by precoding (e.g., changing a beam pattern by applying a specific precoding matrix), and so forth.

In block 735, it may be determined whether the direction is the same as the end device. For example, wireless station 110 may calculate the spatial locale of wireless end device 180. Wireless station 110 may compare the spatial locales and determine whether the direction of the source and wireless end device 180 are the same.

When it is determined that the directions are the same (block 735—YES), process 700 may continue to block 725. For example, wireless station 110 may wait a back-off time period.

When it is determined that the directions are not the same (block 735—NO), the data is transmitted via the downlink channel (block 740). For example, wireless station 110 transmits the data to wireless end device 180 using the unlicensed radio spectrum.

Referring to FIG. 7B, in block 745, the success of the failure of the data transmission is determined. For example, wireless station 110 may receive an ACK or an NACK from wireless station that indicate whether the data transmitted was successful or not.

In block 750, the threshold power value may be increased or decreased. For example, in response to determining the success or the failure of the data transmission, wireless station 110 may apply a positive adjustment value or a negative adjustment value to the threshold power value, as previously described. Based on these values, wireless station 110 calculates an adjusted threshold power value.

In block 755, the adjusted threshold power value is stored. For example, wireless station 110 may update the threshold power value as the adjusted threshold power value.

Although FIGS. 7A and 7B illustrate another exemplary process 700 of the service, according to other embodiments, process 700 may include additional operations, fewer operations, and/or different operations than those illustrated in FIGS. 7A and 7B, and described herein. For example, in block 740, wireless station 110 may select one or multiple communication parameter values that correlate to the threshold power value (e.g., a default data rate, an adjusted data rate, an adjusted transmit power, etc.).

Figure 8A:
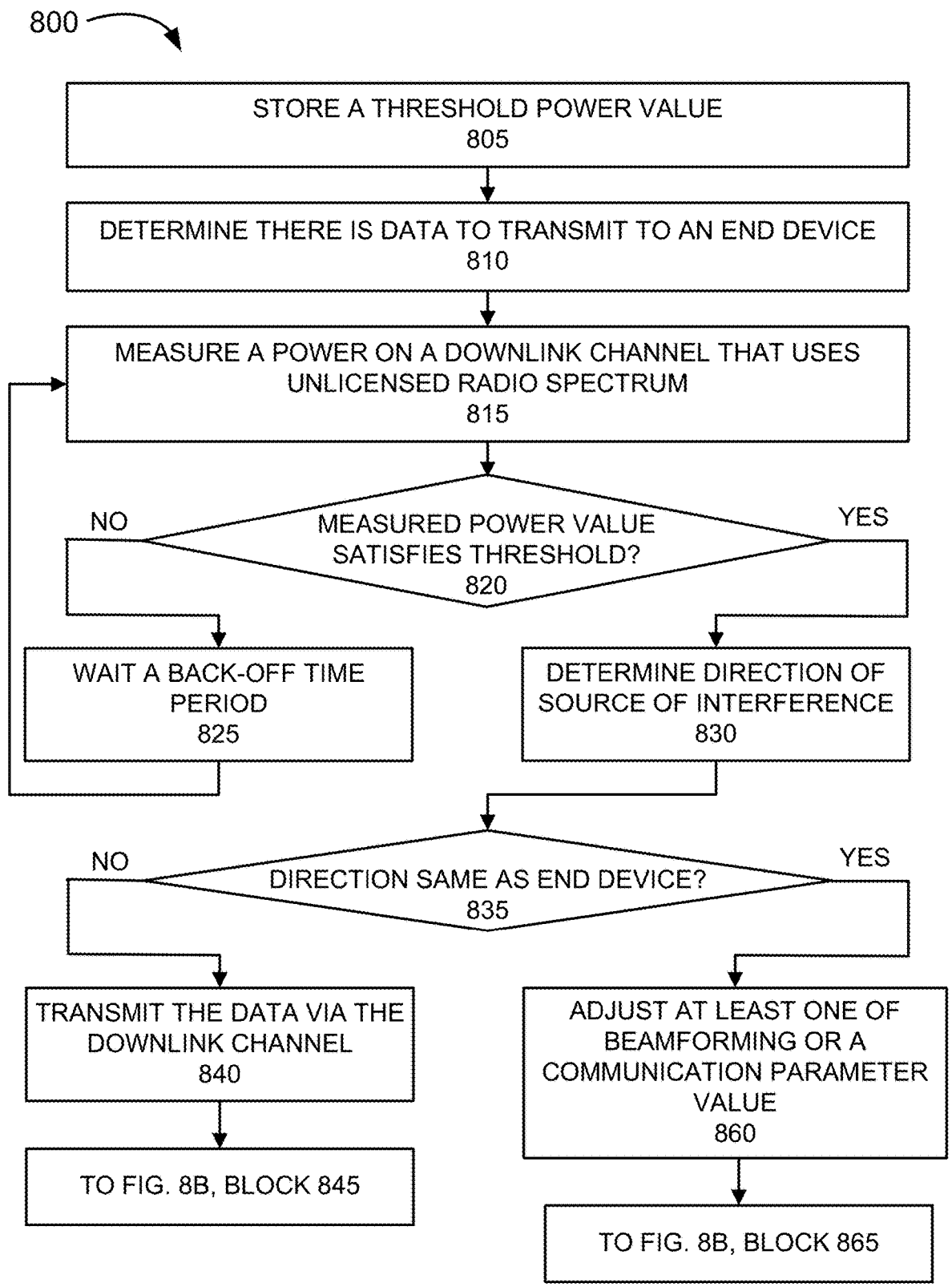
FIGS. 8A and 8B are flow diagrams illustrating yet another exemplary process of an exemplary embodiment of the LBT-based dynamic energy detection service.
Figure 8B:
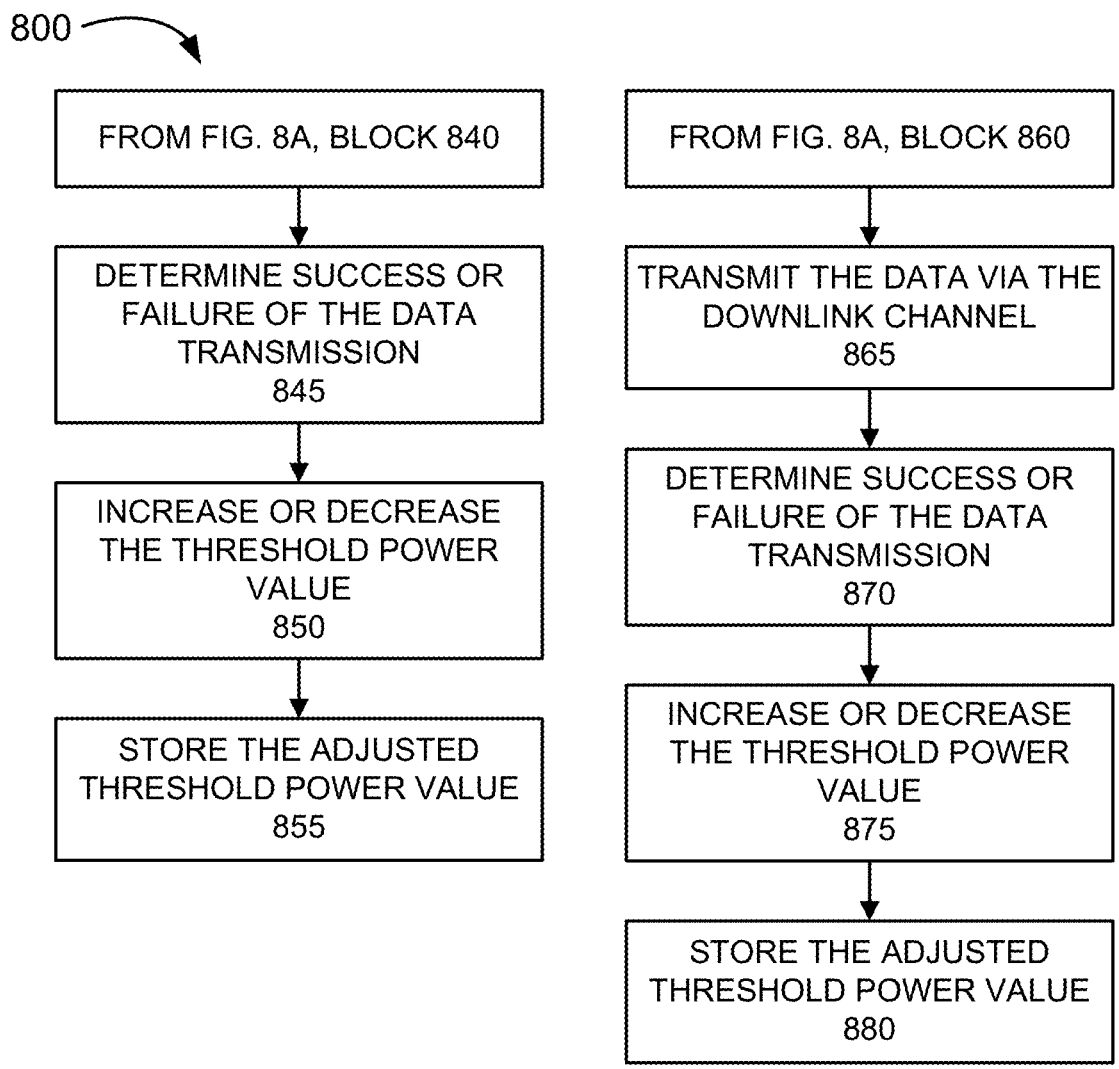

FIGS. 8A and 8B are flow diagrams illustrating yet another exemplary process 800 of an exemplary embodiment of the LBT-based dynamic energy detection service. According to an exemplary embodiment, wireless station 110 performs steps of process 800. For example, processor 510 executes software 520 to perform the step illustrated in FIGS. 8A and 8B, and described herein. It may be assumed that wireless end device 180 is attached to wireless station 110, and unlicensed radio spectrum is used to support downlink transmission of user plane data to wireless end device 180.

Referring to FIGS. 8A and 8B, blocks 805 through 855 are similar to blocks 705 through 755 of FIGS. 7A and 7B. Accordingly, for the sake of brevity, blocks 805 through 855 will not be described.

When it is determined that the direction is the same as the end device (block 835—YES), at least one of beamforming or a communication parameter value is adjusted (block 860). For example, wireless station 110 may execute a beamforming procedure that minimizes interference from the source (even though the direction is not the same) in relation to the transmission of the data to wireless end device 180. Additionally, or alternatively, wireless station 110 may adjust one or multiple communication parameter values (e.g., data rate, transmit rate, modulation scheme) relative to a default value or an adjusted value that may be stored in table 300 and correlated to the threshold power value.

Referring to FIG. 8B, blocks 865 through 880 are similar to blocks 840 through 855. Accordingly, for the sake of brevity, these steps will not be described again.

Although FIGS. 8A and 8B illustrate another exemplary process 800 of the service, according to other embodiments, process 800 may include additional operations, fewer operations, and/or different operations than those illustrated in FIGS. 8A and 8B, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described with regard to the processes illustrated in FIGS. 6, 7A, 7B, 8A, and 8B, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory/storage 515.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
    storing, by a network device of a wireless access network, a threshold power value;
    determining, by the network device, that there is data to transmit to an end device that is attached to the network device;
    measuring, by the network device in response to the determining that there is data to transmit to the end device, a power value on a downlink channel that uses unlicensed radio spectrum;
    comparing, by the network device, the measured power value to the threshold power value;
    transmitting, by the network device based on determining that the measured power value satisfies the threshold power value, the data to the end device via the downlink channel;
    determining, by the network device, a success or a failure of the transmitting based on a message received from the end device;
    increasing, by the network device, the threshold power value in response to determining the failure; and
    decreasing, by the network device, the threshold power value in response to determining the success.

2. The method of claim 1, further comprising:
    storing, by the network device, a positive adjustment value and a negative adjustment value, and wherein the increasing further comprises:

adding, by the network device, the positive adjustment value to the threshold power value that generates a first adjusted threshold power value, and wherein the decreasing further comprises:
adding, by the network device, the negative adjustment value to the threshold power value that generates a second adjusted threshold power value.

3. The method of claim 2, wherein the positive adjustment value and the negative adjustment value are dynamic values, and the method further comprises:
storing, by the network device, the first adjusted threshold power value or the second adjusted threshold power value; and
using, by the network device, the first adjusted threshold power value or the second adjusted threshold power value to compare with a subsequent measured power value of the downlink channel.

4. The method of claim 1, further comprising:
waiting, by the network device, a back-off time period in response to determining that the measured power value does not satisfy the threshold power value.

5. The method of claim 1, further comprising:
determining, by the network device in response to determining that the measured power value satisfies the threshold power value, a location of a source pertaining to the measured power value; and
determining, by the network device, whether the location of the source is the same as a location of the end device.

6. The method of claim 5, further comprising:
waiting, by the network device, a back-off time period in response to determining that the location of the source is the same as the location of the end device.

7. The method of claim 5, wherein the transmitting further comprises:
transmitting, by the network device, the data to the end device via the downlink channel based on determining that the location of the source is not the same as the location of the end device.

8. The method of claim 1, wherein the network device is a next generation Node B (gNB), an evolved Node B (eNB), or an evolved eNB (eLTE eNB).

9. A network device of a wireless access network comprising:
a communication interface;
a memory, wherein the memory stores instructions; and
a processor, wherein the processor executes the instructions to:
store a threshold power value;
determine that there is data to transmit to an end device that is attached to the network device;
measure, in response to the determination that there is data to transmit to the end device, a power value on a downlink channel that uses unlicensed radio spectrum;
compare the measured power value to the threshold power value;
transmit, via the communication interface based on a determination that the measured power value satisfies the threshold power value, the data to the end device via the downlink channel;
determine a success or a failure of the transmission based on a message received from the end device;
increase the threshold power value in response to a determination of the failure of the transmission; and
decrease the threshold power value in response to a determination of the success of the transmission.

10. The network device of claim 9, wherein the processor further executes the instructions to:
store a positive adjustment value and a negative adjustment value, and wherein, when increasing, the processor further executes the instructions to:
add the positive adjustment value to the threshold power value that generates a first adjusted threshold power value, and wherein, when decreasing, the processor further executes the instructions to:
add the negative adjustment value to the threshold power value that generates a second adjusted threshold power value.

11. The network device of claim 10, wherein the positive adjustment value and the negative adjustment value are dynamic values, and the processor further executes the instructions to:
store the first adjusted threshold power value or the second adjusted threshold power value; and
use the first adjusted threshold power value or the second adjusted threshold power value to compare with a subsequent measured power value of the downlink channel.

12. The network device of claim 9, wherein the processor further executes the instructions to:
wait a back-off time period in response to a determination that the measured power value does not satisfy the threshold power value.

13. The network device of claim 9, wherein the processor further executes the instructions to:
determine, in response to the determination that the measured power value satisfies the threshold power value, a location of a source pertaining to the measured power value; and
determine whether the location of the source is the same as a location of the end device.

14. The network device of claim 13, wherein the processor further executes the instructions to:
wait a back-off time period in response to a determination that the location of the source is the same as the location of the end device.

15. The network device of claim 13, wherein, when transmitting, the processor further executes the instructions to:
transmit, via the communication interface, the data to the end device via the downlink channel based on a determination that the location of the source is not the same as the location of the end device.

16. The network device of claim 9, wherein the network device is a next generation Node B (gNB), an evolved Node B (eNB), or an evolved eNB (eLTE eNB).

17. A non-transitory computer-readable storage medium storing instructions executable by a processor of a device, which when executed cause the device to:
store a threshold power value;
determine that there is data to transmit to an end device that is attached to the device;
measure, in response to the determination that there is data to transmit to the end device, a power value on a downlink channel that uses unlicensed radio spectrum;
compare the measured power value to the threshold power value;
transmit the data to the end device via the downlink channel based on a determination that the measured power value satisfies the threshold power value;
determine a success or a failure of the transmission based on a message received from the end device;

increase the threshold power value in response to a determination of the failure of the transmission; and decrease the threshold power value in response to a determination of the success of the transmission.

18. The non-transitory computer-readable storage medium of claim 17, further storing instructions executable by the processor of the device, which when executed cause the device to:

wait a back-off time period in response to a determination that the measured power value does not satisfy the threshold power value.

19. The non-transitory computer-readable storage medium of claim 17, further storing instructions executable by the processor of the device, which when executed cause the device to:

determine, in response to the determination that the measured power value satisfies the threshold power value, a location of a source pertaining to the measured power value; and determine whether the location of the source is the same as a location of the end device.

20. The non-transitory computer-readable storage medium of claim 19, further storing instructions executable by the processor of the device, which when executed cause the device to:

wait a back-off time period in response to a determination that the location of the source is the same as the location of the end device.

\* \* \* \* \*